US011856256B1

(12) United States Patent
Li et al.

(10) Patent No.: US 11,856,256 B1
(45) Date of Patent: Dec. 26, 2023

(54) PRESENCE-DETECTION MODES FOR DISPLAY DEVICES

(71) Applicant: Amazon Technologies, Inc., Seattle, WA (US)

(72) Inventors: Zheda Li, Mountain View, CA (US); Vivek Yenamandra, Milpitas, CA (US); Aditya V Padaki, Richardson, TX (US); F N U Rohit Kumar, San Jose, CA (US); Morris Yuanhsiang Hsu, Mountain View, CA (US); Sai Prashanth Chinnapalli, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/709,198

(22) Filed: Mar. 30, 2022

(51) Int. Cl.
*H04N 21/442* (2011.01)
*H04N 21/443* (2011.01)

(52) U.S. Cl.
CPC ......... *H04N 21/44218* (2013.01); *H04N 21/4436* (2013.01)

(58) Field of Classification Search
None
See application file for complete search history.

(56) References Cited

U.S. PATENT DOCUMENTS

| 9,288,387 | B1* | 3/2016 | Keller | H04W 8/183 |
|---|---|---|---|---|
| 9,313,556 | B1* | 4/2016 | Borel | G11B 27/28 |
| 9,392,320 | B1* | 7/2016 | Damle | H04N 21/4424 |
| 10,930,126 | B1* | 2/2021 | Jeong | H04N 23/611 |
| 2007/0120970 | A1* | 5/2007 | Goffin | H04N 21/4223 |
| | | | | 348/E7.081 |
| 2010/0084918 | A1* | 4/2010 | Fells | G01V 3/10 |
| | | | | 307/32 |
| 2011/0134243 | A1* | 6/2011 | Siann | H04N 7/181 |
| | | | | 348/143 |
| 2012/0151527 | A1* | 6/2012 | Kumar | H04N 21/4826 |
| | | | | 725/40 |
| 2013/0194438 | A1* | 8/2013 | Sweet, III | G06F 3/005 |
| | | | | 348/207.1 |
| 2014/0184910 | A1* | 7/2014 | Bailey | H04N 21/42208 |
| | | | | 348/554 |
| 2014/0198960 | A1* | 7/2014 | Thompson | G06V 40/13 |
| | | | | 382/124 |
| 2015/0346824 | A1* | 12/2015 | Chen | H04N 5/144 |
| | | | | 345/156 |
| 2016/0026841 | A1* | 1/2016 | Merrell | G06V 40/1306 |
| | | | | 382/124 |

(Continued)

*Primary Examiner* — William J Kim
(74) *Attorney, Agent, or Firm* — Lee & Hayes, P.C.

(57) ABSTRACT

This disclosure describes, in part, techniques for using presence detection in order to switch between power modes of a display device. For instance, the display device may operate in a first power mode by deactivating a display. While operating in the first power mode, the display device may use a sensor to detect a presence of a possible object. The display device may then switch to a second power mode in order to verify that the possible object is an actual object. In response, the display device may switch to a third power mode by at least activating the display and presenting a user interface using the display. The display device may then receive an interaction. In response, the display device may switch to a fourth power mode by at least presenting content.

19 Claims, 14 Drawing Sheets

(56) References Cited

U.S. PATENT DOCUMENTS

| | | | | |
|---|---|---|---|---|
| 2017/0076571 A1* | 3/2017 | Borel | ............... | H04N 21/8153 |
| 2017/0078767 A1* | 3/2017 | Borel | ............... | G11B 27/031 |
| 2018/0011530 A1* | 1/2018 | Gelonese | ............... | H04N 5/63 |
| 2019/0306468 A1* | 10/2019 | Ho | ............... | H04N 7/185 |
| 2019/0354226 A1* | 11/2019 | Choi | ............... | G06F 3/0416 |
| 2020/0107071 A1* | 4/2020 | Doshi | ............... | H04N 21/44204 |
| 2020/0125252 A1* | 4/2020 | Ahn | ............... | H04M 1/0202 |
| 2020/0219509 A1* | 7/2020 | Raman | ............... | G16H 50/30 |
| 2020/0336788 A1* | 10/2020 | Kosugi | ............... | H04H 60/33 |
| 2021/0377601 A1* | 12/2021 | Patil | ............... | G06F 1/3287 |
| 2022/0400310 A1* | 12/2022 | Dawson | ............... | H04N 21/252 |

\* cited by examiner

US 11,856,256 B1

PRESENCE-DETECTION MODES FOR DISPLAY DEVICES

BACKGROUND

Display devices, such as televisions and computer monitors, use various techniques in order to conserve power. For example, a display device may require an interaction, such as a touch input from a user or a command from a control device, to initially be turned on. Next, if the user does not interact with the display device for a period of time, the display device may activate a screensaver. Additionally, if the user continues to not to interact with the display device for another period of time, the display device may automatically turn off. However, this may cause inconvenience for the user, such as when the user is utilizing the display device, but not directly interacting with the display device. For example, the user may be watching a movie or viewing a document on the display device without actually providing any inputs to the display device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
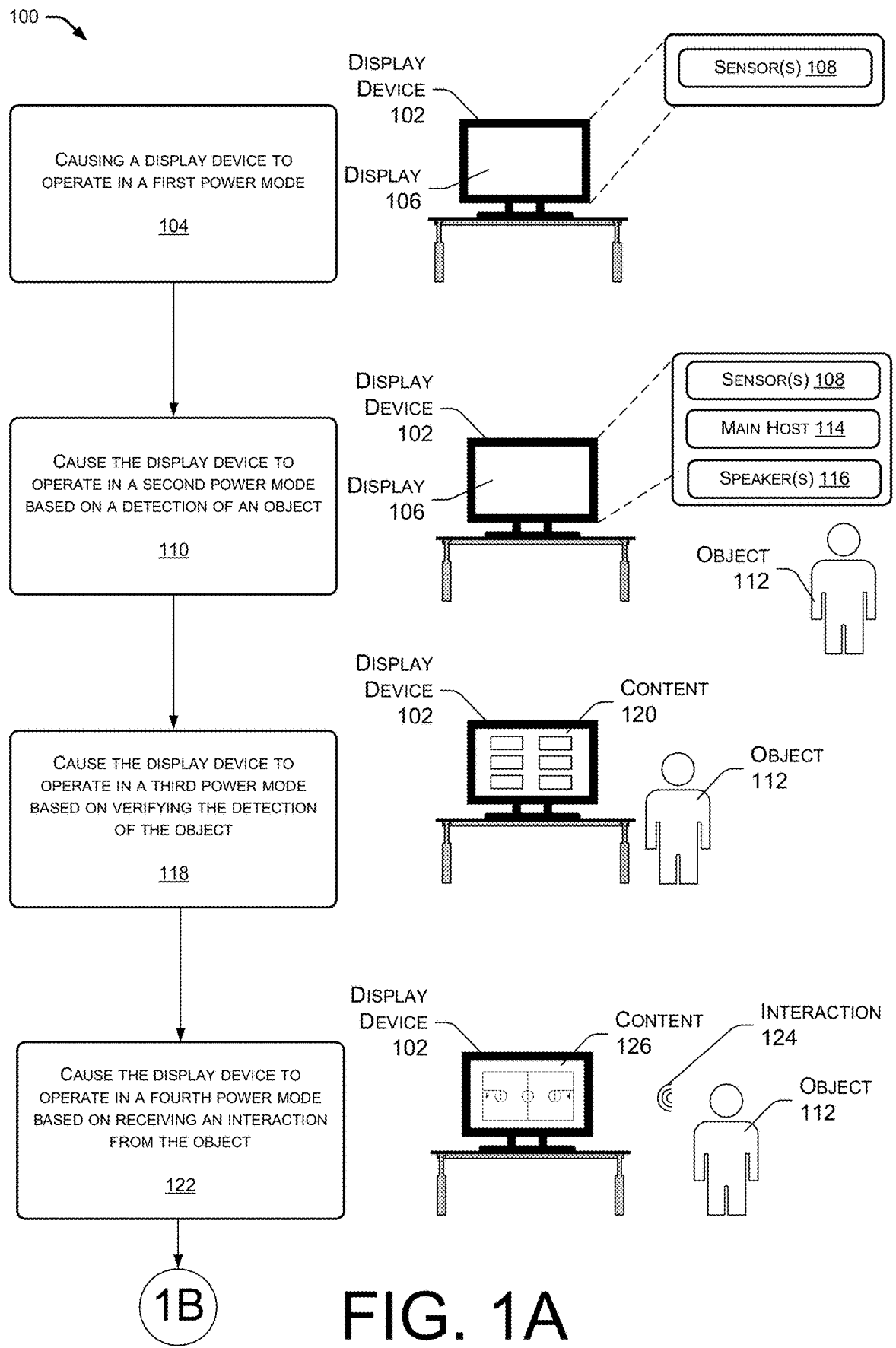
FIGS. 1A-1B illustrate an example process for using presence detection to switch between power modes of a display device, in accordance with examples of the present disclosure.

This disclosure describes, in part, techniques that use presence detection to operate a display device in various power modes. For instance, the display device may include a sensor, such as a radar sensor, that the display device uses to detect objects, such as a user. In some examples, the display device operates in a first presence-detection mode to initially detect an object. The display device then operates in a second, different presence-detection mode that uses additional processing components in order to identify valid location updates associated with object. Based on detecting the presence of the object, the display device may switch between different power modes in order to conserve power. For example, when the display device does not detect the presence of an object, the display device may operate in power modes in which one or more components, such as the display, are deactivated. However, when the display device does detect the presence of the object, the display device may operate in power modes in which the component(s) are activated and/or in which the display device provides specific types of content. By activating the component(s) when an object is detected and deactivating the component(s) when the object is no longer detected, the display device conserves power.

For more details, the display device may include the one or more sensors that the display device uses to detect objects. As described herein, the display device may include, but is not limited to, a television, a monitor, a mobile device, a computer, a laptop, a projector, and/or any other type of device that is able to provide content. Additionally, the sensor(s) may include, but are not limited to, radar sensor(s), lidar sensor(s), distance sensor(s), imaging device(s) (e.g., camera(s)), and/or any other type of sensor that the display device may use to detect objects. In some examples, the display device detects objects that are located within a threshold distance to the display device. The threshold distance may include, but is not limited to, one meter, five meters, ten meters, twenty meters, and/or any other distance. In some examples, the display device is preprogrammed with the threshold distance while, in other examples, a user may set the threshold distance for the display device.

In some examples, before detecting an object, the display device may operate in a first power mode, which may be referred to a "standby-passive mode." In the first power mode, the display device may deactivate (e.g., turn off, cease providing power, etc.) a majority of the components of the display device, such as the display, the speaker(s), the microphone(s), and/or the like. Additionally, the display device may place the main host in a deep sleep mode, such as placing a system on chip (SoC) in the deep sleep mode, suspending the RAM, such as by placing the RAM in a minimum power state that is just sufficient to retain data, and/or the like. Furthermore, the display device may activate (e.g., turn on, provide power to, etc.) the sensor(s) that the display device uses to detect objects. By activating and deactivating such components in the first power mode, the display device is able to conserve power while still being able to detect objects that are proximate to the display device.

In some examples, while operating in the first power mode, the display device may further operate in a first presence-detection mode, which may be referred to as a "motion-detection mode." In the first presence-detection mode, the sensor(s) may generate sensor data and then analyze the sensor data to determine whether a possible object is detected, such as within the threshold distance of the display device. For instance, and in examples where the sensor(s) include radar sensor(s), the first presence-detection mode is used to detect whether there exists peak(s) above an adaptive threshold over the amplitude of samples. Detecting a peak that is above the adaptive threshold over the amplitude of samples may indicate the presence of a possible object. When the sensor(s) detect a possible object, the sensor(s) may then send, to the main host of the display device, output data indicating the detection of the possible object.

Based on detecting the presence of a possible object (e.g., receiving the output data from the sensor(s)), the display device may then switch to operating in a second power mode, which may be referred to as a "standby-active mode." In the second power mode, the display device may activate one or more of the components that were deactivated while in the first power mode. For example, the display device may activate the main host (e.g., the SoC), the microphone(s), and/or the like in response to receiving the output data from the sensor(s). In some examples, the display device activates the one or more components by providing power to the one or more components. However, the display device may cause at least the display to remain deactivated.

Additionally, based on detecting the presence of the possible object, the display device may switch to operating in a second presence-detection mode, which may be referred to as a "2D-detection mode." In the second presence-detection mode, the display device may then verify that the possible object is an actual object and/or identify valid location updates associated with the actual object. For example, the display device (e.g., the main SoC) may receive output data from the sensor(s), wherein the output data represents distance(s) to detected object(s), peak power(s) associated with the detected object(s), angle(s) relative to the display device for the detected object(s), and/or any other information. The display device may then analyze the output data, using one or more algorithms, to determine whether there are valid location updates associated with the possible object. In some examples, the display device may determine that there is a valid location update for the possible object when the output data indicates a peak power that satisfies (e.g., is equal to or greater than) a threshold power and when a distance between a previous location and a new location for the object satisfies (e.g., is less than or equal to) a threshold distance. In some examples, the display device may determine that there is a valid location update for the possible object when the output data indicates that a peak power again satisfies the threshold power, but also when a location to the object is within the threshold distance to the display device. Additionally, in some examples, the display device determines that the possible object is an actual object based on the display device continuously detecting valid location updates for the possible object for a threshold period of time (referred to, in some examples, as a "first threshold period of time"). The first threshold period of time may include, but is not limited to, one second, two seconds, three seconds, five seconds, and/or any other time period.

Based on verifying the actual object, the display device may then switch to operating in a third power mode, which may be referred to as an "ambient mode." In the third power mode, the display device may again activate one or more components that were deactivated while operating in the second power mode. For example, the display device may activate the display, the speaker(s), and/or the like. Additionally, the display device may provide a first type of content using the display. For example, the display device may present a user interface that includes one or more icons for a user (e.g., the actual object). The icon(s) may include, but are not limited to, a clock, a calendar, image(s), a shopping application, a channel selection application, a show selection application, a streaming application, and/or the like. This way, the user is able to interact with the display device, such as through voice inputs, touch inputs, a control device associated with the display device, and/or the like.

Next, based on receiving an interaction, the display device may switch to operating in a fourth power mode, which may be referred to as a "content mode." In the fourth power mode, the display device activates its components in order to allow the user to use the display device as normally intended. For example, if the display device is a television and the user wants to watch a show, the television may receive, from one or more sources, video data representing content associated with the show. The television may then present the content to the user using the display. However, in other examples, the display device may output other types of media data, such as sound represented by audio data, a notification represented by notification data, an image represented by image data, screensaver data representing a screensaver, and/or the like. In some examples, the display device will remain operating in this fourth power mode as long as the display device continues to detect the presence of the user and/or as long as the user continues to interact with the display device. For example, as long as the user remains within the threshold distance to the display device, the display device will continue to provide the content to the user.

However, if the display device ceases detecting the presence of the user and also ceases receiving interactions from the user, then the display device may again switch to different power modes. For example, if the display device ceases detecting the presence of the user and also ceases receiving interactions from the user for a threshold period of time (referred to, in some examples, as a "second threshold period of time"), then the display device may activate a screensaver. Additionally, if the display device continues to cease detecting the presence of the user and also continues to cease receiving interactions from the user for another threshold period of time (referred to, in some examples, as a "third threshold period of time"), then the display device may switch to again operating in the third power mode. Furthermore, if the display device continues to cease detecting the presence of the user and also continues to cease receiving interactions from the user for another threshold period of time (referred to, in some examples, as a "fourth threshold period of time"), then the display device may switch to operating in the second power mode. Finally, if the display device continues to cease detecting the presence of the user and also continues to cease receiving interactions from the user for another threshold period of time (referred to, in some examples, as a "fifth threshold period of time"), then the display device may switch to operating in the first power mode and/or the first presence-detection mode. The display device may perform such processes in order to conserve power when users are not actively using the display device.

In some examples, the display device may switch between the power modes based on again detecting the presence of the user. For a first example, after activating the screensaver, the display device may again detect the presence of the user (and/or another user) and/or receive an interaction from the user before the second threshold period of time expires. In response, the display device may again switch back to operating in the fourth power mode (e.g., display the content instead of the screensaver). For a second example, after switching back to operating in the third power mode, the display device may again detect the presence of the user (and/or another user) and/or receive an interaction from the user before the third threshold period of time expires. In response, the display device may again switch back to operating in the fourth power mode. For a third example, after switching back to operating in the second power mode, the display device may again detect the presence of the user (and/or another user) and/or receive an interaction from the user before the fourth threshold period of time expires. In response, the display device may again switch back to operating in the third power mode by activating the display. This way, the display device does not completely turn off, except for the sensor(s) for presence detection (e.g., switch back to the first power mode), if the user just momentarily is not located proximate to the display device.

While these examples describe switching between the power modes when the display device no longer detects the presence of the user, in other examples, the display device may perform one or more other processes for conserving power. For example, while displaying the content, the display device may again cease detecting the presence of the user for the second threshold period of time. In response, and instead of activating the screensaver, the display device may lower the brightness of the display.

By performing the processes described herein, the display device is able to switch between different power modes using presence detection in addition to normal interactions with a user. This may save power for the display device, such as by powering down different components based on no longer detecting the presence of the user. For example, the display device may operate in lower-power modes when the user walks away from the display device, but then automatically turn back on when the user returns. Additionally, this may improve the experience for the user, such as by remaining on (e.g., in the fourth power mode) even when the display device is no longer receiving interactions from the user. As described herein, the display device will remain on since the display device is still detecting the presence of the user as being proximate to the display device.

Figure 1B:
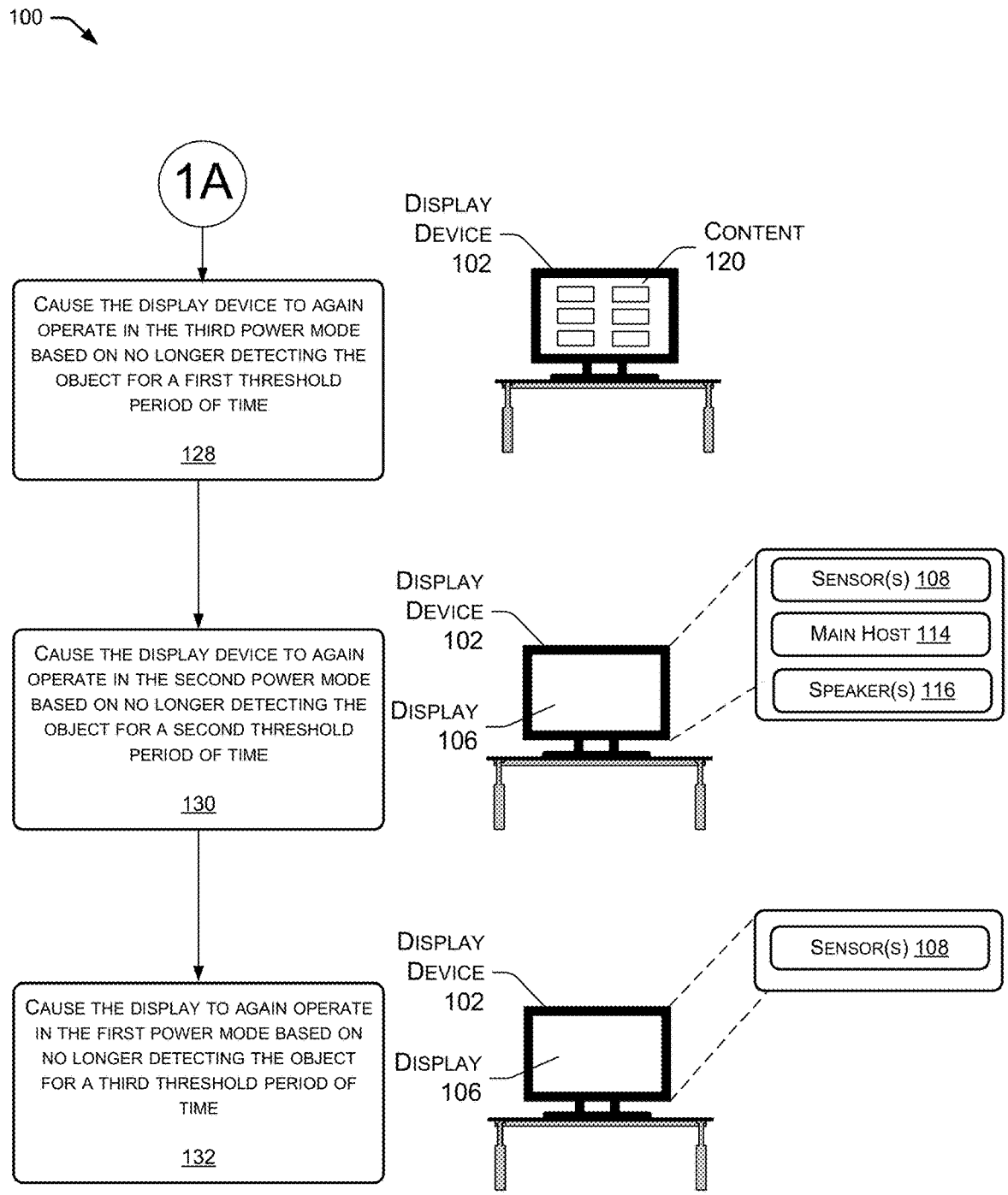

FIGS. 1A-1B illustrate an example process 100 for using presence detection to switch between power modes of a display device 102, in accordance with examples of the present disclosure. At 104, the process 100 may include causing a display device 102 to operate in a first power mode. For instance, the display device 102 may initially operate in the first power mode. As described herein, when operating in the first power mode, the display device 102 may deactivate (e.g., turn off, cease providing power, etc.) a majority of the components of the display device 102, such as a display, speaker(s), microphone(s), and/or the like. Additionally, the display device 102 may place the main host in a deep sleep mode, such as placing a SoC in the deep sleep mode, suspending the RAM, such as by placing the RAM in a minimum power state that is just sufficient to retain data, and/or the like. Furthermore, sensor(s) 108 of the display device 102 may remain activated in order to detect objects located proximate to the display device 102. The sensor(s) 108 may include, but are not limited to, radar sensor(s), lidar sensor(s), distance sensor(s), imaging device(s), and/or any other type of sensor 108 that the display device 102 may use to detect objects.

At 110, the process 100 may include causing the display device 102 to operate in a second power mode based on a detection of an object 112. For instance, while operating in the first power mode, the display device 102 may operate in a first presence-detection mode in which the sensor(s) 108 detect the presence of the object 112, which is described in detail below. Based on detecting the presence of the object 112, the display device 102 may switch from operating in the first power mode to operating in the second power mode. In the example of FIGS. 1A-1B, the display device 102 switches to operating in the second power mode by at least activating one or more components, such as a main host 114 (e.g., the main SoC) and speaker(s) 116. However, in other examples, the display device 102 may activate additional and/or alternative components. The display device 102 may further switch from operating in the first presence-detection mode to operating in a second presence-detection mode that the display device 102 uses to verify the object 112 and/or identify valid updates associated with locations of the object 112.

At 118, the process 100 may include causing the display device 102 to operate in a third power mode based on verifying the detection of the object 112. For instance, the display device 102 may verify that the object 112 is an actual object 112 while operating in the second presence-detection mode. As described in more detail below, and in some examples, the display device 102 may verify the object 112 based on detecting the presence of the object 112 (e.g., detecting valid location updates associated with the object 112), within the threshold distance from the display device 102, for the first threshold period of time. Based on verifying the detection of the object 112, the display device 102 may then switch from operating in the second power mode to operating in the third power mode. In the example of FIGS. 1A-1B, the display device 102 switches to operating in the third power mode by at least activating one or more components, such as the display 102. Additionally, while operating in the third power mode, the display device 102 may present first content 120, such as a user interface that includes one or more icons.

At 122, the process 100 may include causing the display device 102 to operate in a fourth power mode based on receiving an interaction 124 from the object 112. For instance, while operating in the third power mode, the display device 102 may receive the interaction 124 from the object 112. In the example of FIGS. 1A-1B, the interaction 124 includes a voice input received from the object 112. However, in other examples, the display device 102 may receive a different type of interaction 124. Based on receiving the interaction 124, the display device 102 may switch from operating in the third power mode to operating in the fourth power mode. In the example of FIGS. 1A-1B, the display device 102 switches to operating in the fourth power mode by at least presenting second content 126, such as a movie, a show, a sporting event, and/or any other type of video content using the display 106.

At 128, the process 100 may include causing the display device 102 to again operate in the third power mode based on no longer detecting the object 112 for a first threshold period of time. For instance, the display device 102 may continue to analyze the sensor data generated by the sensor(s) 108 in order to continue detecting the presence of the object 112. If the display device 102 no longer detects the presence of the object 112 using the sensor data, then the display device 102 may start a counter. Additionally, once the counter reaches the first threshold period of time without again detecting the object 112 and/or again receiving an interaction, then the display device 102 may switch from operating in the fourth power mode to operating in the third power mode. In the example of FIGS. 1A-1B, the display device 102 switches to operating in the third power mode by at least again presenting the first content 120 using the display 106. However, in other examples, the display device 102 may initially present a screensaver before switching back to the third power mode.

At 130, the process 100 may include causing the display device 102 to again operate in the second power mode based on no longer detecting the object 112 for a second threshold period of time. For instance, after switching to the third power mode, the display device 102 may continue to analyze the sensor data generated by the sensor(s) 108 in order to detect the presence of the object 112 and/or another object. If the display device 102 still does not detect the presence of the object 112 and/or another object using the sensor data and/or receive an interaction, then the display device 102 may cause the counter to continue. Additionally, once the counter reaches the second threshold period of time without again detecting the object 112 and/or again receiving an interaction, then the display device 102 may switch from operating in the third power mode to operating in the second power mode. In the example of FIGS. 1A-1B, the display device 102 switches to operating in the second power mode by at least deactivating the display 106.

At 132, the process 100 may include causing the display device 102 to again operate in the first power mode based on no longer detecting the object 112 for a third threshold period of time. For instance, after switching to the second power mode, the display device 102 may continue to analyze the sensor data generated by the sensor(s) 108 in order to detect the presence of the object 112 and/or another object. If the display device 102 still does not detect the presence of the object 112 and/or another object using the sensor data and/or receive an interaction, then the display device 102 may cause the counter to continue. Additionally, once the counter reaches the third threshold period of time without again detecting the object 112 and/or again receiving an interaction, then the display device 102 may switch from operating in the second power mode to operating in the first power mode. In the example of FIGS. 1A-1B, the display device 102 switches to operating in the first power mode by at least deactivating the speaker(s) 116, placing the main host 114 in the deep sleep state, and/or the like. Additionally, in some examples, the display device 102 may again operate in the first presence-detection mode.

Figure 2:
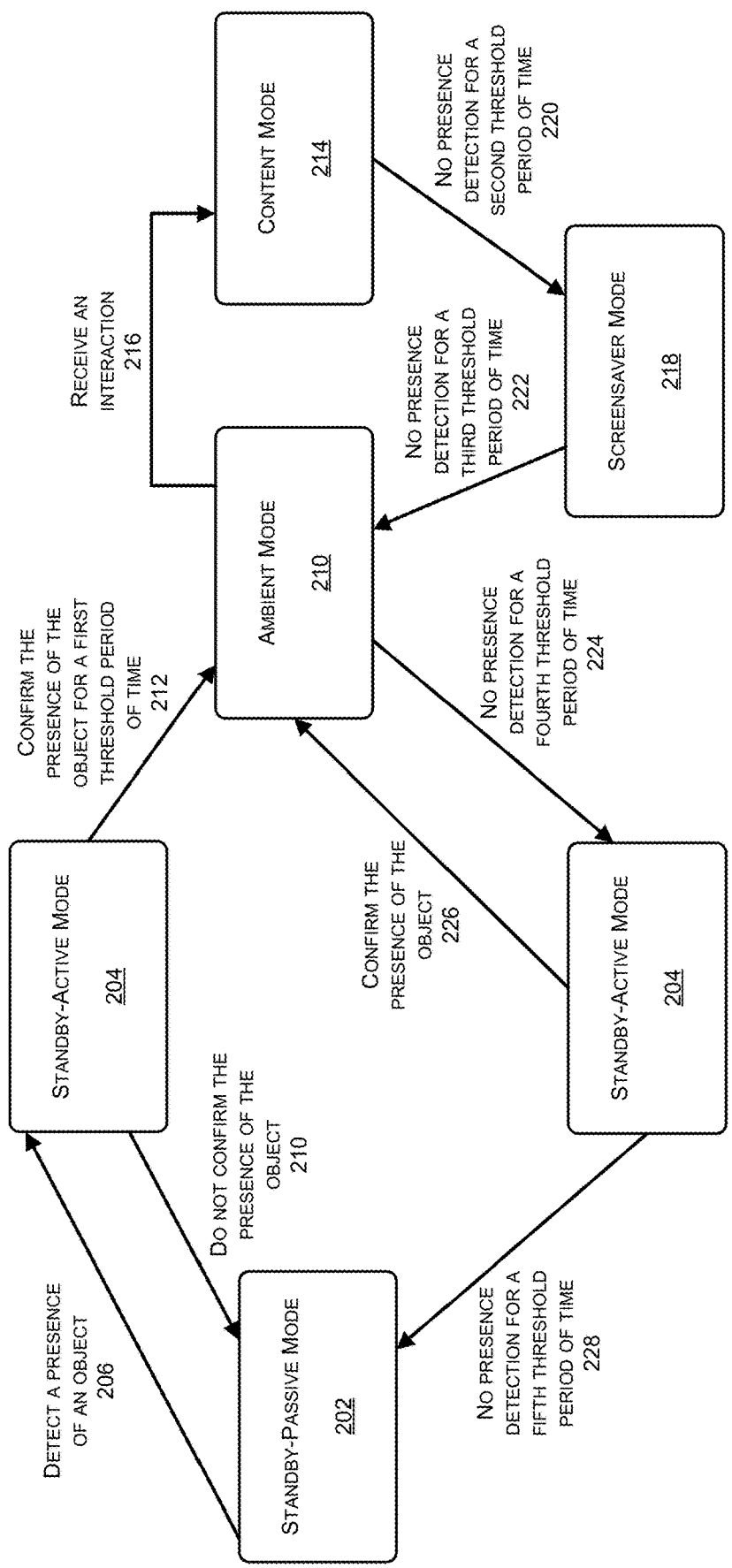
FIG. 2 illustrates an example of switching between different power modes associated with a display device, in accordance with examples of the present disclosure.

FIG. 2 illustrates an example of switching between different power modes associated with a display device, in accordance with examples of the present disclosure. As shown, the display device (e.g., the display device 102) may initially operate in a standby-passive mode 202. As described herein, in the standby-passive mode 202, the display device may deactivate (e.g., turn off, cease providing power, etc.) a majority of the components of the display device, such as the display, the speaker(s), the microphone(s), and/or the like. Additionally, the display device may place the main host in a deep sleep mode, such as placing a SoC in the deep sleep mode, suspending the RAM, such as by placing the RAM in a minimum power state that is just sufficient to retain data, and/or the like. Furthermore, the display device may activate (e.g., turn on, provide power to, etc.) the sensor(s) that the display device uses to detect objects, where the sensor(s) operate in a first presence-detection mode. By activating and deactivating such components in the standby-passive mode, the display device is able to conserve power while still being able to detect objects that are proximate to the display device.

The display device may then operate in a standby-active mode 204 based on detecting a presence of an object 206. As described herein, in the standby-active mode 204, the display device may activate one or more of the components that were deactivated while in the standby-passive mode 202. For example, the display device may activate the main host, the microphone(s), and/or the like. However, the display device may cause at least the display to remain deactivated. In some examples, the display device activates the main host based on receiving output data from the sensor(s), where the output data indicates the presence of the possible object. In some examples, the display device activates the one or more components by providing power to the one or more components. In some examples, the display device further switches to operating in the second presence-detection mode. As shown in the example of FIG. 2, if the display device is unable to confirm the presence of the object, then the display device may switch back to operating in the standby-passive mode.

However, the display device may operate in an ambient mode 210 based on confirming the presence of the object for a first threshold period of time 212. As described herein, in the ambient mode 210, the display device may activate one or more components that were deactivated while operating in the standby-active mode 204. For example, the display device may activate the display, the speaker(s), and/or the like. Additionally, the display device may provide a first type of content using the display. For example, the display device may present a user interface that includes one or more icons for a user. The user is then able to interact with the display device. Additionally, the display device may continue to operate in the second presence-detection mode.

For example, the display device may operate in a content mode 214 based on receiving an interaction 216. As described herein, in the content mode 214, the display device activates its components in order to allow the user to use the display device as normally intended. For example, if the user wants to watch a show, the display device may receive, from one or more sources, video data representing content associated with the show. The display device may then present the content to the user using the display. However, in other examples, the display device may output other types of media data, such as sound represented by audio data, a notification represented by notification data, an image represented by image data, screensaver data representing a screensaver, and/or the like. In some examples, the display device will remain operating in this content mode 214 as long as the display device continues to detect the presence of the user and/or as long as the user continues to interact with the display device. For example, as long as the user remains within the threshold distance to the display device, the display device will continue to provide the content to the user.

For example, the display device may operate in a screensaver mode 218 based on not detecting the presence of the object and/or not receiving an interaction for a second threshold period of time 220. As described herein, in the screensaver mode 218, the display device may switch to presenting a screensaver instead of the content. In some examples, while operating in the screensaver mode 218, the display device may switch back to operating in the content mode 214 based on again detecting the presence of an object and/or again receiving an interaction. However, if the display device continues to not detect the presence of an object and/or continues to not receive an interaction for a third threshold period of time 222, then the display device may switch back to operating in the ambient mode 210. For example, the display device may again present the user interface instead of the screensaver. As shown, if the display device again receives an interaction 216, then the display device will again switch to operating in the content mode 214.

While operating in the ambient mode 210, if the display device does not detect the presence of an object and/or receive an interaction for a fourth period of time 224, then the display device may switch to again operating in the standby-active mode 204. For example, the display device may deactivate the one or more components that were activated while switching to the ambient mode 210. For instance, the display device may deactivate the display, the speaker(s), and/or the like. While again operating in the standby-active mode 204, the display device may again switch to operating in the ambient mode 210 if the display device again confirms the presence of an object.

However, while operating in the standby-active mode 204, if the display device does not detect the presence of an object for a fifth threshold period of time 228, then the display device may again operate in the standby-passive mode 202. For example, the display device may place the main host in a deep sleep mode, such as placing the SoC in the deep sleep mode, suspending the RAM, such as by placing the RAM in a minimum power state that is just sufficient to retain data, and/or the like. In some examples, the display device further switches to operating in the first presence-detection mode.

Figure 3:
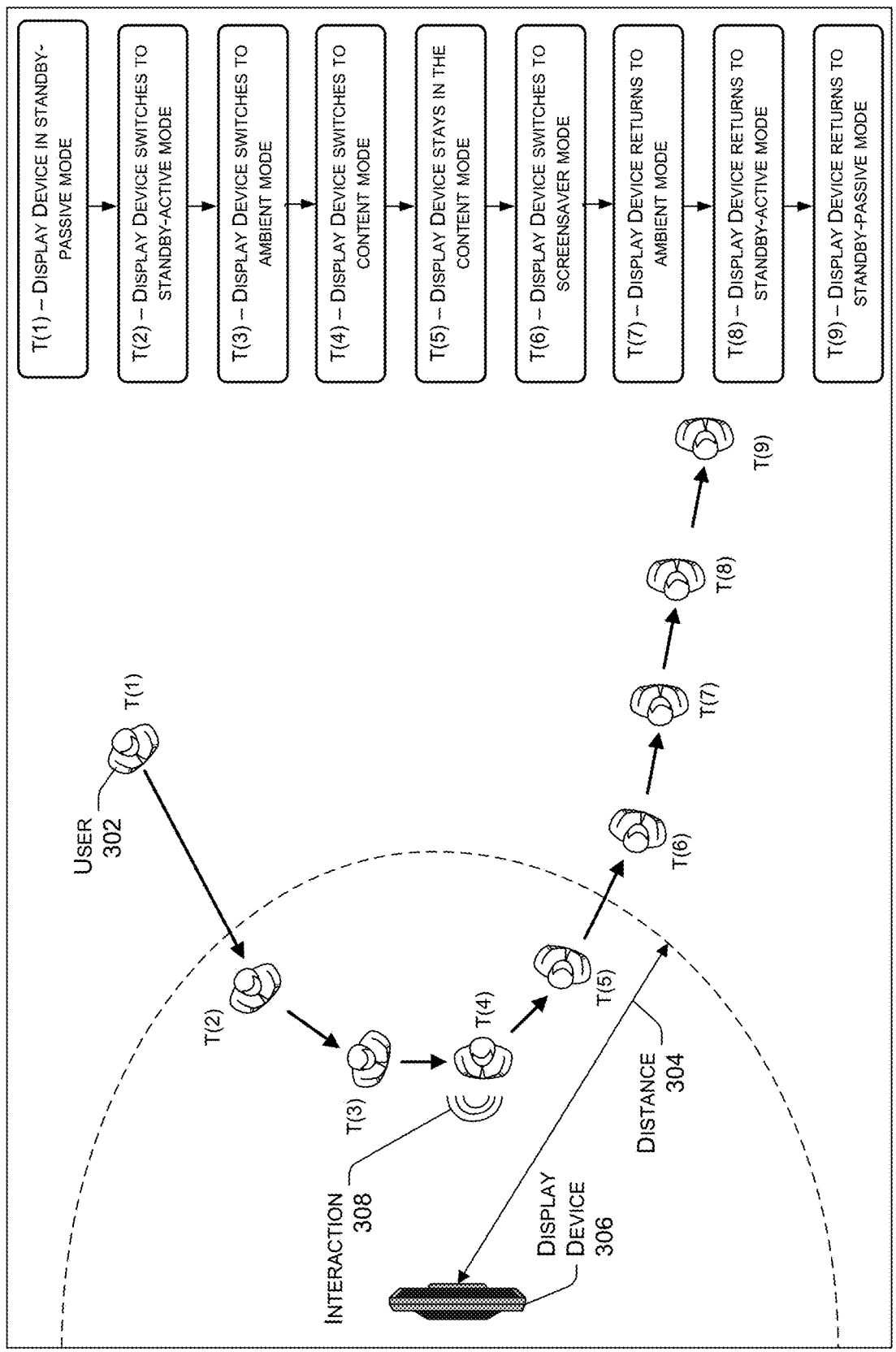
FIG. 3 illustrates an example of a display device switching between power modes over a period of time, in accordance with examples of the present disclosure.

FIG. 3 illustrates an example of a display device switching between power modes over a period of time, in accordance with examples of the present disclosure. As shown, at a first time T(1), a user 302 may be located outside of a threshold distance 304 from a display device 306. As such, the display device 306 may operate in the standby-passive mode 202. Next at a second time T(2), the user 302 may be located within the threshold distance 304 to the display device 306. As such, the display device 306 may detect the presence of the user 302 within the threshold distance 304 and switch to operating in the standby-active mode 204. Next, at a third time T(3), the display device 306 may verify the presence of the user 302. As such, the display device may switch to operating in the ambient mode 210. Next, the display device 306 may detect an interaction 308 from the user 302. As such, the display device 306 may switch to operating in the content mode 214. Next, at a fifth time T(5), the display device 306 may continue to detect the presence of the user 302. As such, the display device 306 may remain operating in the content mode 214.

Next, at a sixth time T(6), the display device 306 may no longer detect the user 302 and/or detect that the user 302 is outside of the threshold distance 304 for the second threshold period of time. As such, the display device 306 may switch to the screensaver mode 218. Next, at a seventh time T(7), the display device 306 may continue to not detect the user 302 and/or detect that the user 302 is outside of the threshold distance 304 for the third threshold period of time. As such, the display device 306 may switch to the ambient mode 210. Next, at an eighth time T(8), the display device 306 may continue to not detect the user 302 and/or detect that the user 302 is outside of the threshold distance 304 for the fourth threshold period of time. As such, the display device 306 may switch to the standby-active mode 204. Finally, at a ninth time T(9), the display device 306 may continue to not detect the user 302 and/or detect that the user 302 is outside of the threshold distance 304 for the fifth threshold period of time. As such, the display device 306 may switch to the standby-passive mode 202.

Figure 4:
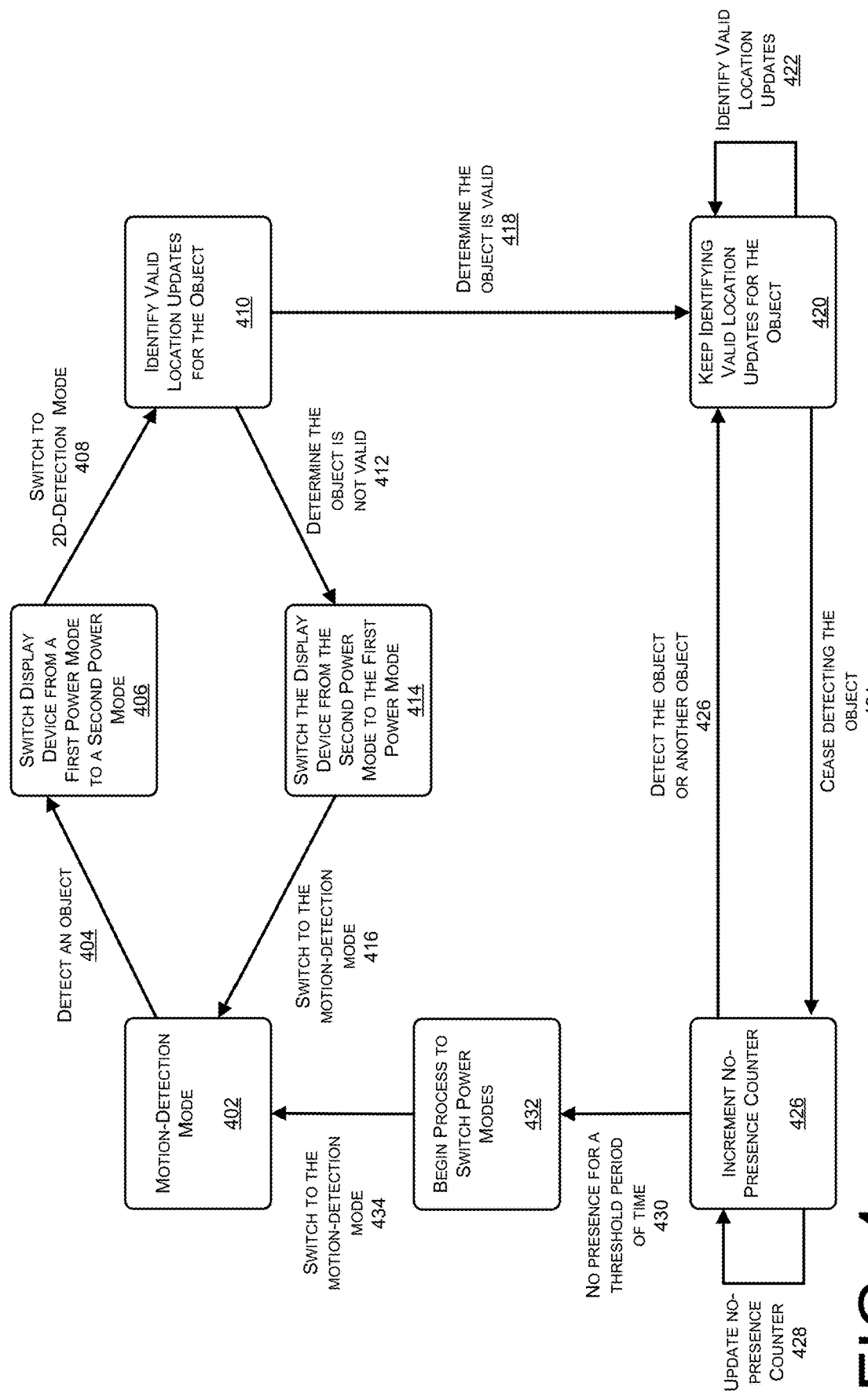
FIG. 4 illustrates an example of switching between different presence-detection modes, in accordance with examples of the present disclosure.

FIG. 4 illustrates an example of switching between different presence-detection modes, in accordance with examples of the present disclosure. In the example of FIG. 4, the display device may initially be operating in a motion-detection mode 402 (e.g., the first presence-detection mode described in examples herein). In some examples, in the motion-detection mode 402, the sensor(s) may internally generate sensor data and then analyze the sensor data to determine whether an object is detected. For example, such as when the sensor(s) include radar sensor(s), the radar sensor(s) may determine whether there exists peak(s) above an adaptive threshold over the amplitude of range samples, where each Fast Fourier Transformation (FFT) sample represents a range bin.

Figure 5A:
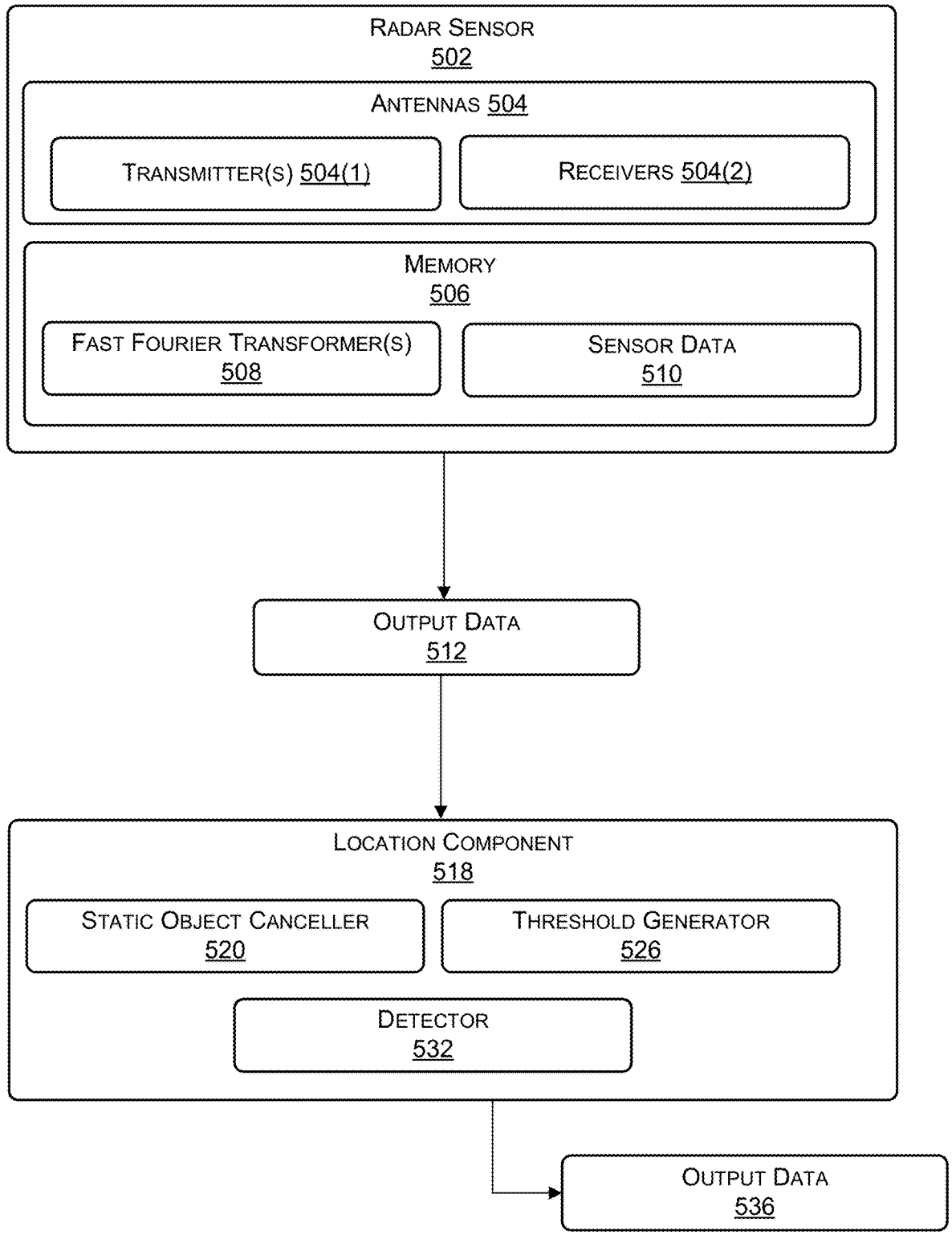
FIG. 5A illustrates an example architecture of a radar sensor, according to various examples of the present disclosure.

For example, FIG. 5A illustrates an example architecture of a sensor, according to various examples of the present disclosure. Referring to FIG. 5A, the location sensor includes a radar sensor 502 that includes antennas 504 and memory 506. The memory 506 includes at least one Fast Fourier Transformer(s) (FFT(s)) 508. While the example of FIG. 5A illustrates the transmitter(s) 504(1) as being separate from the receiver(s) 504(2), in other examples, the receiver(s) 504(2) may include the transmitters(s) 504(1).

Figure 5B:
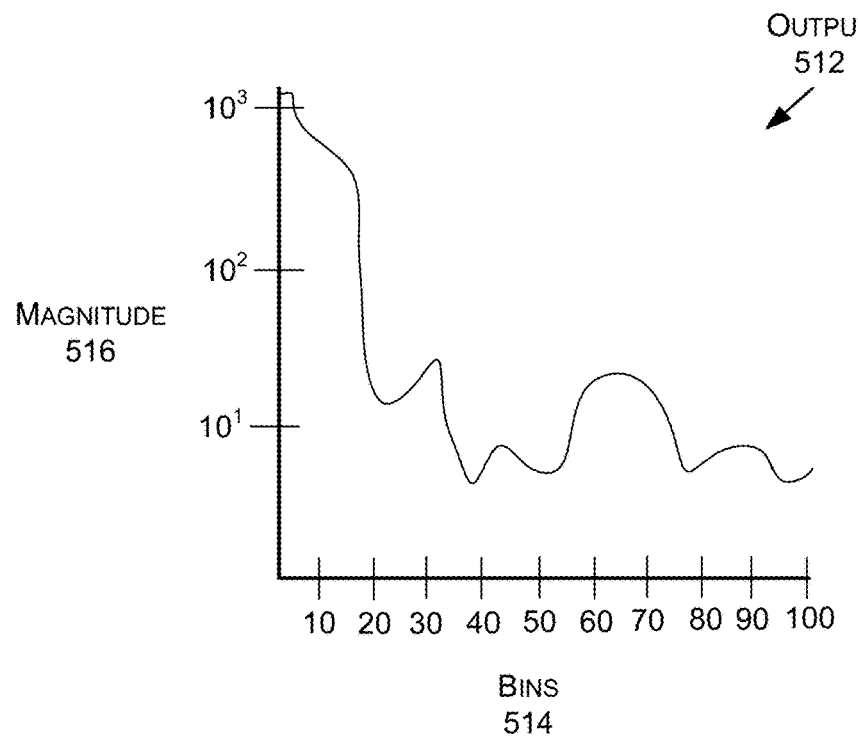
FIG. 5B illustrates an example of determining a distance to an object, according to various examples of the present disclosure.
Figure 5B:
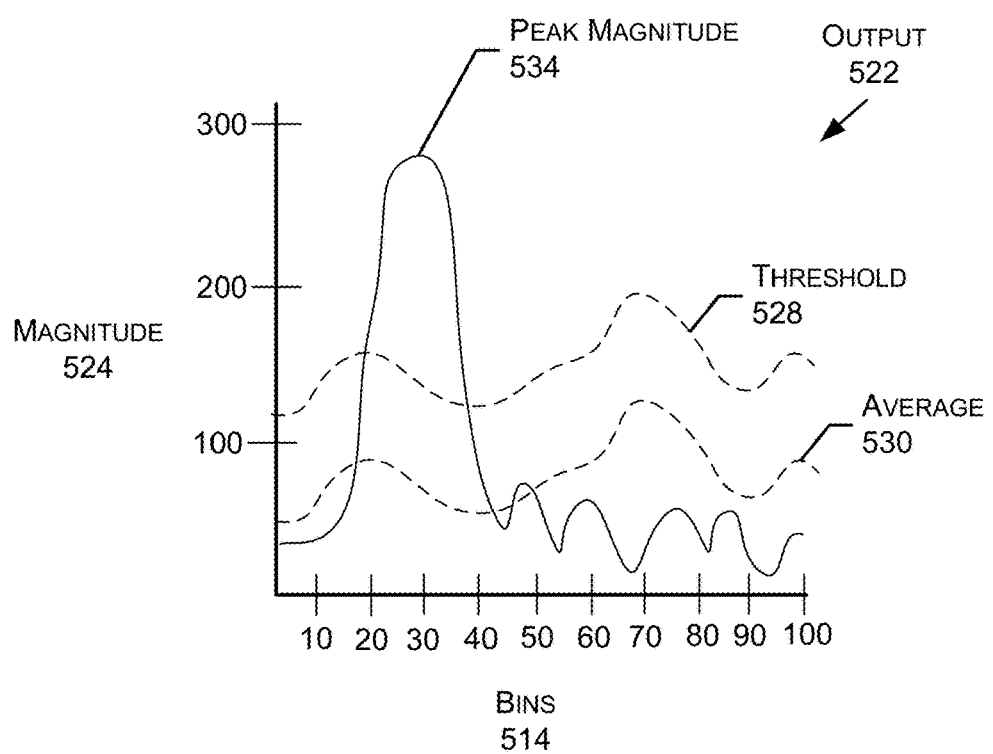

In some examples, each frame output by the transmitter(s) 504(1) consists of a signal that represents a chirp. The transmitter(s) 504(1) output the signal, which is reflected off of at least one object, and then received by the receiver(s) 504(2), which generate sensor data 510 representing the signal. The sensor data 510 is then passed to the FFT(s) 508 for processing. For example, the FFT(s) 508 include one or more algorithms that are configured to convert a time domain and/or space domain from the signal to a representation in a frequency domain. The output is a measure of how strong the reflected signal is at a specific distance from the display device. In some examples, each frequency bin of the FTT(s) 508 corresponds to a physical distance away the display device. For example, and as illustrated in FIG. 5B, output data 512 representing a frame may include one hundred bins 514, where each bin 514 represents a distance (e.g., 22.5 centimeters) from the display device. However, the one hundred bins 514 is only an example, where other examples may include any number of bins which each represent any distance. The output data 512 further represents a magnitude 516 of the frequency of the signal at each of the bins 514. A location component 518 may then use the output data 512 to determine a distance of an possible object relative to the display device.

For example, since the output data 512 represents the magnitude 516 for all objects, a static object canceller 520 may be configured to subtract output data 512 representing a previous frame (and/or output data 512 representing more than one previous frame) from the current output data 512. Based on the subtraction, the static object canceller 520 may generate an output 522 that represents a magnitude 524 of dynamic objects. In some examples, a threshold generator 526 may then generate a threshold magnitude level 528 associated with detecting objects. In some examples, the threshold generator 526 generates the threshold magnitude level 528 using one or more algorithms, such as a constant false alarm rate (CFAR) algorithm. For instance, the threshold generator 526 may generate the threshold magnitude level 528 by taking the average of the magnitudes 530 detected by the radar sensor 502 over a period of time. The period of time may include, but is not limited to, one minute, five minutes, one hour, one day, and/or any other period of time. Additionally, or alternatively, in some examples, the threshold generator 526 generates the threshold magnitude level 528 by multiplying the average 530 of the magnitudes by a given multiplier. The multiplier may include, but is not limited to, 1.2, 1.5, 2, 3, and/or any other multiplier.

For example, the threshold generator 526 may perfor 516m an exponential average over the observed range of FFT measurements using the following equation:

$$y(n)=\alpha y(n-1)+(1-\alpha)\times(n) \quad (1)$$

In equation (1), x(n) is the range-FTT vector of the n-th chirp, y(n) is the averaged results following the above equation. As such, the frequency-dependent threshold may be determined by the following equation:

$$T(n)=y(n)+\text{motion\_threshold}[dB]$$

In the motion-detection mode 402, a proper setting for a may be set. Specifically, y(n) may be interpreted as the frequency-dependent noise evaluation at the n-th chirp.

A detector 532 may then analyze the output 522 in order to identify at least one peak magnitude that satisfies the threshold magnitude level 528. For example, and in the example of FIG. 5B, the detector 532 may identify a peak magnitude 534 around bin 514 third-two that satisfies the threshold magnitude level 528. Based on identifying the peak magnitude 534, the detector 532 may detect a possible object. Additionally, the detector 532 may analyze the output 522 to determine a distance to the possible object. In some examples, the detector 532 may determine the distance by multiplying the bin 514 for which the peak magnitude 534 was detected by the distance associated with each bin 514. For instance, and in the example of FIG. 5B, the detector 532 may determine that the distance is 720 centimeters (e.g., 32×22.5).

Additionally, in some examples, the location component 518 may determine an angle to the possible object. For example, the detector 532 may use the one or more algorithms, along with the horizontal-separation between the receivers 504(2), to convert the time domain from the signal to output phase information for determining the angle. For example, assume that a complex vector for a first receiver channel is $C_1$ and that a complex vector for a second receiver channel is $C_2$. The detector 532 may then determine a complex conjugate Y as (conjugate($C_1$)×$C_2$) and a phase difference P is derived as (a tan 2(imag(Y), real(Y)). In some examples, the detector 532 may determine a moving average of the phase difference.

The detector 532 may then convert the phase difference P to the angle A using the following equation:

$$A = \sin^{-1}\left(\frac{W(P)}{2\pi d}\right) \quad (4)$$

In equation (4), w is the wavelength and d is the distance between the antennas 504. (While this is just one example of how to determine the angle, in other examples, the detector may use additional and/or alternative techniques.

The detector 532 may then generate output data 536 indicating that the possible object that was detected, the distance to the possible object, the angle to the possible object, the peak magnitude associated with the possible object, and/or the like. In some examples, the detector 532 may perform these processes in order to generate output data 536 representing more than one object. For example, the output data 536 may represent the distances, the angles, and the peak magnitudes for two objects, five objects, ten objects, and/or the like. In some examples, the output data 536 is sent to the main host of the display device.

While the example of FIG. 5A illustrates the location component 518 as being separate from the radar sensor 502, in other examples, the location component 518 may be included as part of the radar sensor 502.

Returning to FIG. 4, if the sensor(s) detect an object while the display device is operating in the motion-detection mode 402, the sensor(s) may send the output data 536 indicating that the object is detected, which is represented by 404. In response, the display device may perform the processes described herein in order to switch from operating in a first power mode to operating in a second power mode 406. For example, the display device may switch from operating in the standby-passive mode 202 to operating in the standby-active mode 204. Additionally, the display device may switch from operating in the motion-detection mode 402 to operating in a 2D detection mode 408. While operating in the 2D-detection mode 208, the display device may then attempt to determine valid location updates for the object 410.

Figure 6:
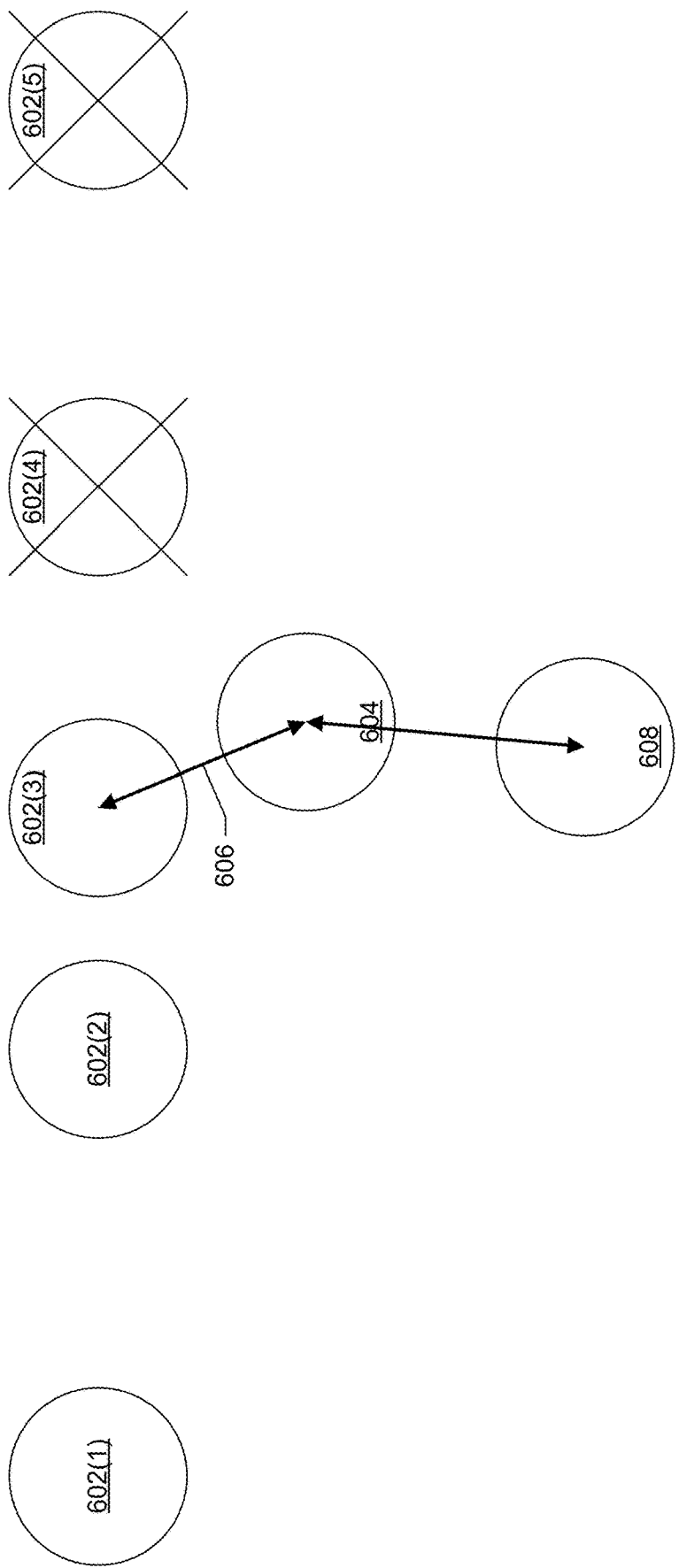
FIG. 6 illustrates an example of updating target(s) associated with object(s) located proximate to a display device, in accordance with examples of the present disclosure.

For example, the sensor(s) may continue to send the output data 536, such as data that represents each frame. In some examples, as described above, the output data 536 may represent at least distance(s) to detected object(s), peak power(s) associated with the detected object(s), angle(s) relative to the display device for the detected object(s), and/or any other information. The display device may then use this data to attempt to identify valid location updates for a valid object. For example, and as illustrated in FIG. 6, the display device (e.g., the sensor(s)) may initially use the output data 536 to identify a given number of targets 602(1)-(5) (also referred to as "targets 602"), where each target 602 represents a possible dynamic object located proximate to the display device. In the example of FIG. 6, the display device initially identifies five targets 602. However, in other examples, the display device may identify any number of initial targets 602. In some examples, the display device identifies the targets 602 as including five highest peaks.

The display device then uses the output data 536 to identify valid targets 602. In some examples, the display device identifies a valid target 602 as a target 602 that is associated with a power threshold that satisfies (e.g., is equal to or greater than) a threshold power and is associated with a distance that is within (e.g., is less than or equal to) the threshold distance (e.g., the threshold distance 304). For instance, and in the example of FIG. 6, the display device may determine that the power associated with the fourth target 602(4) does not satisfy (e.g., is less than) the threshold power. As such, the display device may determine that the fourth target 602(4) does not include a valid target, which is represented by the "X". The display device may also determine that a distance associated with the fifth target 602(5) does not satisfy (e.g., is greater than) the threshold distance. As such, the display device may also determine that the fifth target 602(5) does not include a valid target, which is represented by the "X".

Next, the display device may continue to receive the output data 536 from the sensor(s) and use the output data 536 to associate valid centroid updates with existed trajectories of targets 602(1)-(3). For example, and as illustrated, the display device may receive output data 536 representing a distance to a new target 604, a peak power associated with the new target 604, an angle relative to the display device for the new target 604, and/or the like. The display device may then determine that the new target 604 includes a valid location update to one of the valid targets 604(1)-(3). In some examples, the display device makes the determination based on the distance between the new target 604 and one of the existing valid targets 604(1)-(3) satisfying (e.g., being less than or equal to) a threshold distance. For instance, and in the example of FIG. 6, the display device may determine that the new target 604 includes a valid location update for the target 604(3) based on a distance 606 satisfying the threshold distance. The threshold distance may include, but is not limited to, 20 centimeters, 50 centimeters 90 centimeters, 150 centimeters, and/or any other distance.

In some examples, the display device may continue to receive the output data 536 and use the output data 536 to perform valid location updates, such as then identifying another valid location updated target 608. The display device may use these location updates in order to determine the trajectory of one or more valid targets. In some examples, the display device may also determine a score associated with each valid target, such as the valid target 602(3). In such examples, the score may indicate the number of valid location updates along the trajectory. For example, the display device may determine the score by multiplying the number of valid location updates by the frame interval. Additionally, the display device may use the score to determine whether a target includes a valid object. For example, the display device may determine that the target 602(3) is the valid object based on the score associated with the target 602(3) satisfying (e.g., being equal to or greater than) a threshold score. In some examples, the score may satisfy the threshold score based on the display device identifying valid location updates for the first threshold period of time.

While the example of FIG. 6 only illustrates identifying valid location updates for a single target 602(3), in other examples, the display device may identify valid location updates for multiple targets. For example, the display device may determine that there are valid location updates for the other initial valid targets 602(1)-(3). This may occur when there are three users that are all located within the threshold distance to the display device.

While the example above describes using the distance(s) to the detected object(s) to identify the valid location updates, in other examples, the display device may use the peak power(s). For example, the display device may analyze the output data 536 in order to determine a peak power associated with a detected object. In some examples, the display device may then identify a valid location update when the peak power satisfies (e.g., is equal to or greater than) a threshold power, but determine that there is not a valid location update when the peak power does not satisfy (e.g., is less than) the threshold power. Additionally, in some examples, the display device may identify a valid location update when the peak power indicates that the detected object is within the threshold distance to the display device, but determine that there is not a valid location update when the peak power indicates that the detected object is outside of the threshold distance.

Referring back to FIG. 4, if the display device determines that the object is not valid 412, then the display device may switch from operating in the second power mode to operating in the first power mode 414. For example, the display device may switch from operating in the standby-active mode 204 to operating in the standby-passive mode 202. Additionally, the display device may switch from operating in the 2D-detection mode 408 to operating in the motion-detection mode 402 at 416.

However, if the display device determines that the object is valid 418, then the display device may continue to identify valid location updates for the object 420. For example, and at 422, the display device may continue to receive output data 536 from the sensor(s). The display device may then continue to perform the processes above, using the output data 536, in order to identify the valid location updates for the target 602 associated with the object. As long as the display device keeps determining that there are valid location updates for the target 602, then the display device may determine that the object is still within the threshold distance to the display device. Additionally, based on determining that the object is valid, and while identifying the valid location updates, the display device may also switch to operating in a new power mode. For example, the display device may operate in the ambient mode 210 or the content mode 214.

However, if the display device ceases detecting the object 424, then the display device may begin to increment a no-presence counter 426. For instance, if the display device determines that there are no valid location updates for any of the target(s) using the output data 536 from the sensor(s), then the display device may determine that there are no users within the threshold distance to the display device. As such, the display device may start to increment the no-presence counter. Additionally, while the no-presence counter is incrementing, the display device may continue to receive the output data 536 from the sensor(s) in order to determine if there is a new valid target. If the display device identifies a new valid target using the output data 536, then the display device may again detect the object or detect another object 426. As such, the display device may again begin to identify valid location updates for that object 420. However, if the display device does not identify new valid target, then the display device may continue to update the no-presence counter 428.

If the display device determines that there is no presence for a threshold period of time 430 using the no-presence counter, then the display device may begin to switch power modes 432. For a first example, if the display device does not detect a presence of an object for the second threshold period of time, then the display device may switch to the screensaver mode 218. For a second example, if the display device continues to not detect a presence of an object for the third threshold period of time, then the display device may switch to the ambient mode 210. For a third example, if the display device continues to not detect a presence of an object for the fourth threshold period of time, then the display device may switch to the standby-active mode 204. Still, for a fifth example, if the display device continues to not detect a presence of an object for the fifth threshold period of time, then the display device may switch to the standby-passive mode 202.

Additionally, the display device may switch from operating in the 2D-detection mode 408 to operating in the motion-detection mode 402 at 416. In some examples, the display device switches to the motion-detection mode 402 based on also switching to the standby-passive mode 202.

Figure 7A:
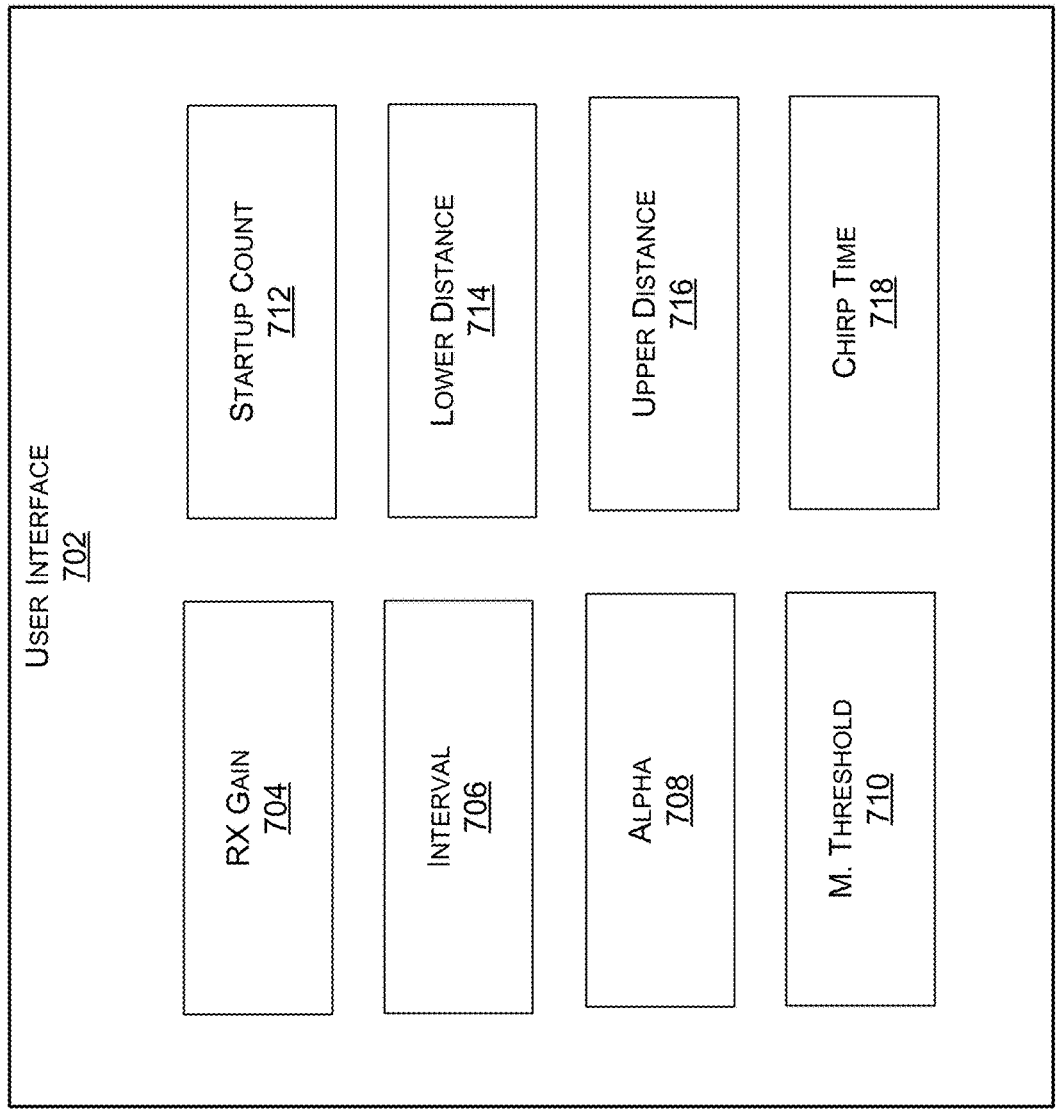
FIG. 7A illustrates an example user interface for configuring a motion-detection mode of a display device, in accordance with examples of the present disclosure.

FIG. 7A illustrates an example user interface 702 for configuring the motion-detection mode 402 of a display device, in accordance with examples of the present disclosure. For example, and using the equations above, the user may be able to set one or more of the parameters for the motion-detection mode 402 using the user interface 702. As shown, the user is able to configure a RX gain 704, an interval 706, an alpha 708, a minimum threshold 710, a startup count 712, a lower distance 714 associated with the threshold distance, an upper distance 716 associated with the threshold distance, and a chirp time 718.

Figure 7B:
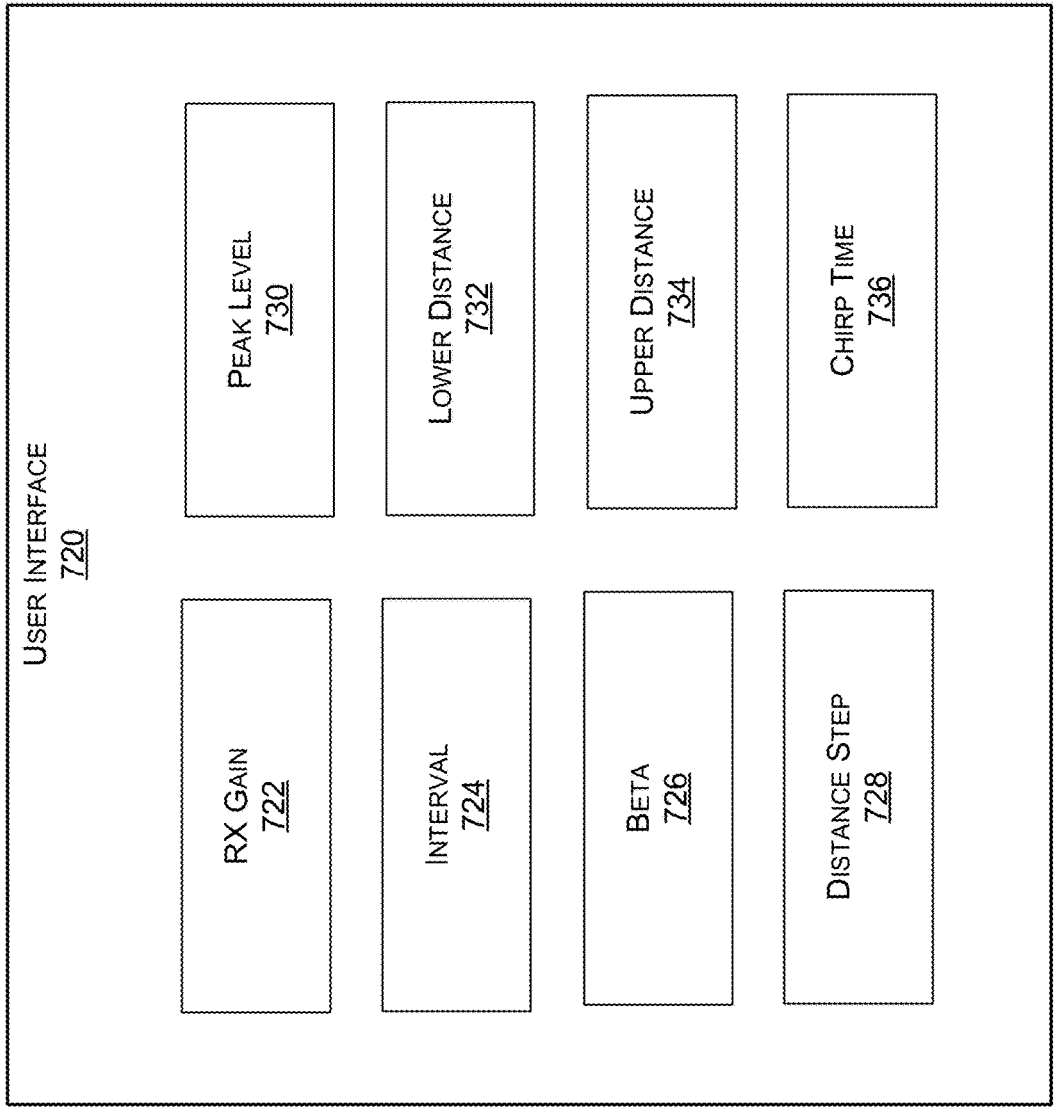
FIG. 7B illustrates an example user interface for configuring a 2D-detection mode of a display device, in accordance with examples of the present disclosure.

Additionally, FIG. 7B illustrates an example user interface 720 for configuring the 2D-detection mode 208 of the display device, in accordance with examples of the present disclosure. For example, and using the equations above, the user may be able to set one or more of the parameters for the 2D-detection mode 208 using the user interface 720. As shown, the user is able to configure a RX gain 722, an interval 724, a beta 726, a distance step 728, a peak level 730, a lower distance 732 associated with the threshold distance, an upper distance 734 associated with the threshold distance, and a chirp time 736. In some examples, one or more of the parameters associated with the motion-detection mode 402 may be the same as one or more of the parameters associated with the 2D-detection mode 408. For example, the RX gain 704 may the same as the RX gain 722, the interval 706 may be the same as the interval 724, the lower distance 714 may be the same as the lower distance 732, the upper distance 716 may be the same as the upper distance 734, and/or the chirp time 718 may be the same as the chirp time 736.

By using the user interface 702, the user is able to set the lower distance 714 and the upper distance 716 that the sensor(s) use when detecting possible objects. For example, the sensor(s) may only send output data indicating a detection of a possible object when the sensor(s) determine that a distance to the possible object is within a range between the lower distance 714 and the upper distance 716. As described herein, a distance may include, but is not limited to, one meter, five meters, ten meters, twenty meters, and/or any other distance. The user may also use the user interface 720 to set the lower distance 732 and the upper distance 734 that the processor(s) of the display device use when identifying valid location updates. For example, the processor(s) may only identify a valid location update when a distance associated with the update is within a range between the lower distance 732 and the upper distance 734.

Additionally, by using the user interface 720, the user is able to set the peak level 730 that the display device uses when determining that a possible object is an actual object and/or when identifying valid location updates for an object. For instance, and as described above, the display device may only identify valid location update(s) when the peak level(s) associated with the target(s) satisfy (e.g., is equal to or greater than) a peak threshold. As such, the user may use the user interface 720 to set the peak level 730, where the peak level 730 corresponds to the peak threshold.

Figure 8:
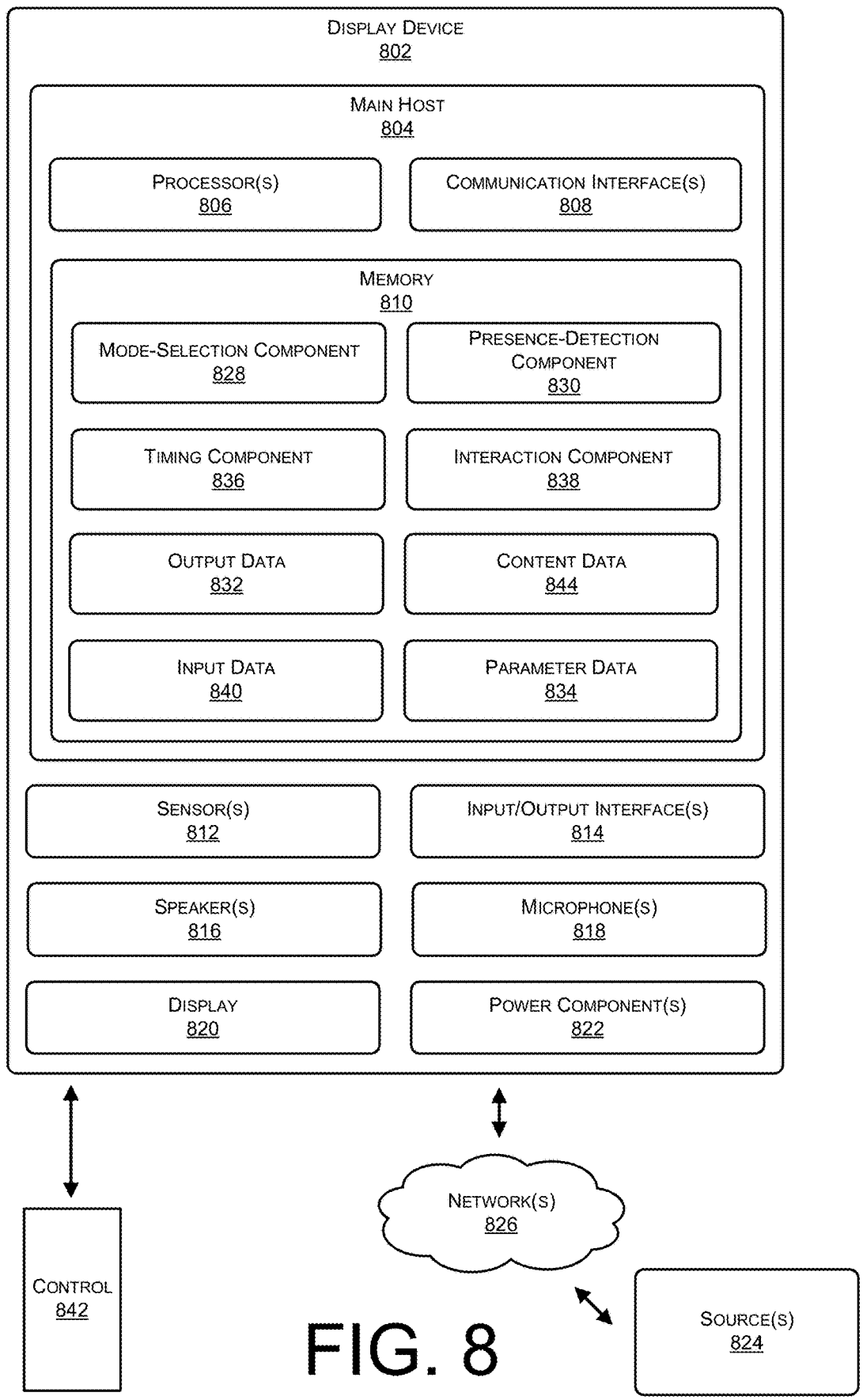
FIG. 8 illustrates an example of a display device, in accordance with examples of the present disclosure.

FIG. 8 illustrates an example of a display device 802, in accordance with examples of the present disclosure. As shown, the display device 802 may include at least a main host 804 (e.g., a SoC), which includes processor(s) 806, communication interface(s) 808, and memory 810, sensor(s) 812, input/output interface(s) 814, speaker(s) 816, microphone(s) 818, a display 820, and power component(s) 822. While the example of FIG. 8 illustrates the main host 804 as including the processor(s) 806, the communication interface(s) 808, and the memory 810, in other examples, the main host 804 may not include one or more of the processor(s) 806, the communication interface(s) 808, or the memory 810. Additionally, in other examples, the main host 804 may include additional components not illustrated in the example of FIG. 8.

The sensor(s) may include any type of sensor that the display device 802 is able to use to detect the presence of objects, such as users. For example, the sensor(s) may include radar sensor(s) (e.g., the radar sensor 502), lidar sensor(s), distance sensor(s), imaging device(s), and/or the like. The input/output interface(s) 814 may include any physical interface that the display device 802 may use to send or receive data, such as an Inter-Integrated Circuit (I2C), a Serial Peripheral Interface bus (SPI), a Universal Serial Bus (USB) as promulgated by the USB Implementers Forum, and so forth. For example, the input/output interface(s) may include an interface for connecting a cable, such as when the display device 802 is a television. Additionally, the display 820 may include any type of display that is able to present content. For example, the display device 802 may include, but is not limited to, a liquid crystal display (LCD), a light-emitting diode (LED) display, a vacuum fluorescent display, an electroluminescent display, a plasma display, a projector, and/or the like.

The process(s) 806 may be configured to execute one or more stored instructions. The processor(s) 806 may comprise one or more cores. The communication interface(s) 808 are configured to provide communications between the display device 802 and other source(s) 824, such as via network(s) 826. The communication interface(s) 808 may include devices configured to couple to personal area networks (PANs), wired and wireless local area networks (LANs), wired and wireless wide area networks (WANs), and so forth. For example, the communication interface(s) 1308 may include devices compatible with Ethernet, Wi-Fi™, and so forth.

The display device 802 may also include the power component(s) 822. The power component(s) 822 are configured to provide electrical power suitable for operating the components in the display device 802. For example, the power component(s) 822 may include any component that is able to receive power from an external power source in order to power the display device 802. For another example, the power component(s) 822 may include internal power component(s), such as one or more batteries, for powering the display device 802.

The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the display device 802. A few example functional modules are shown stored in the memory 810, although the same functionality may alternatively be implemented in hardware, firmware, or as a system on a chip (SOC).

The memory 810 may include a mode-selection component 828 that is configured to select the power modes and the presence-detection modes for operating the display device 802. For example, the mode-selection component 828 may perform the processes described herein in order to select between the first power mode (e.g., the standby-passive mode 202), the second power mode (e.g., the standby-active mode 204), the third power mode (e.g., the ambient mode 210), the fourth power mode (e.g., the content mode 214), and the fifth power mode (e.g., the screensaver mode 218). Additionally, the mode-selection component 828 may perform the processes described herein in order to select between the first presence-detection mode (e.g., the motion-detection mode 402) and the second presence-detection mode (e.g., the 2D-detection mode 408). In some examples, the mode-selection component 828 is then configured to cause the display device 802 to operate in the selected modes.

The memory 810 may further include a presence-detection component 830 that is configured to perform the processes described herein in order to detect object(s) and/or identify valid location updates for the object(s) that are located proximate to the display device 802. For example, such as when the display device 802 is operating in the 2D-detection mode 408, the presence-detection component 830 may be configured to receive output data 832 from the sensor(s) 812. As described herein, the output data 512 may represent at least distance(s) to detected object(s), peak power(s) associated with the detected object(s), angle(s) relative to the display device 802 for the detected object(s), and/or any other information. The presence-detection component 830 may then be configured to analyze the output data 832, using the processes described herein, in order to identify valid updates associated with target(s), where the target(s) represented detected object(s). In some examples, the presence-detection component 830 uses set parameters when performing the presence detection, where the parameters are represented by parameter data 834.

The memory 810 may further include a timing component 836 that is configured to perform the timing processes described herein. For example, such as when the display device 802 initially detects an object and the presence-detection component 830 begins to identify valid location updates for the object, the timing component 836 may begin a timer that the presence-detection component 830 may use to determine when the first threshold period of time elapses. The mode-selection component 828 may then use that determination to determine when to operate the display device 802 in the third power mode. Additionally, when the presence-detection component 830 ceases detecting any object, the timing component 836 may be configured to begin a timer, such as the no-presence counter. The mode-selection component 828 may then use the no-presence counter in order to determine when to select between the different modes.

The memory 810 may further include an interaction component 838 that is configured to detect interactions. For a first example, the display device 802 may receive input data 840, such as audio data generated by the microphone(s) 818. The interaction component 838 may then be configured to analyze the audio data in order to detect an interaction, such as a voice command represented by the audio data. For a second example, the display device 802 may receive input data 840, such as a signal from a control device 842 associated with the display device 802. The interaction component 838 may then be configured to analyze the signal in order to detect an interaction, such as input to a specific channel or a selection of a specific show. For a third example, the display device 802 may generate input data 840 representing a physical input, such as when the user interacts with the display 820 (e.g., when the display 820 includes a touch screen). The interaction component 838 may then be configured to analyze the input in order to detect an interaction, such as again an input to a specific channel or a selection of a specific show. While these are just a couple examples of interactions that the interaction component 838 may detect, in other examples, the interaction component 838 may detect additional and/or alternative interactions.

As further illustrated in the example of FIG. 8, the memory 810 may store content data 844. In some examples, the content data 844 represents the content that the display device 802 presents using the display 820. For a first example, the content data 844 may represent the user interface that the display device 802 presents while operating in the third power mode, such as the ambient mode 210. For a second example, the content data 844 may represent the content, such as the shows, the movies, the sporting events, the news, and/or the like, that the display device 802 presents while operating in the fourth power mode, such as the content mode 214. In such an example, the display device 802 may receive the content data 844 from the source(s) 824, such as streaming source(s), cable provider(s), Internet source(s), and/or any other source that is capable of providing content. Still, for a third example, the content data 844 may represent the screensaver(s) that the display device 802 presents while operating in the fifth power mode, such as the screensaver mode 218.

While the example of FIG. 8 illustrates the display device 802 as including a mode-selection component 828, a presence-detection component 830, a timing component 836, and an interaction component 838, in other examples, the display device 802 may include additional and/or alternative components.

Figure 9:
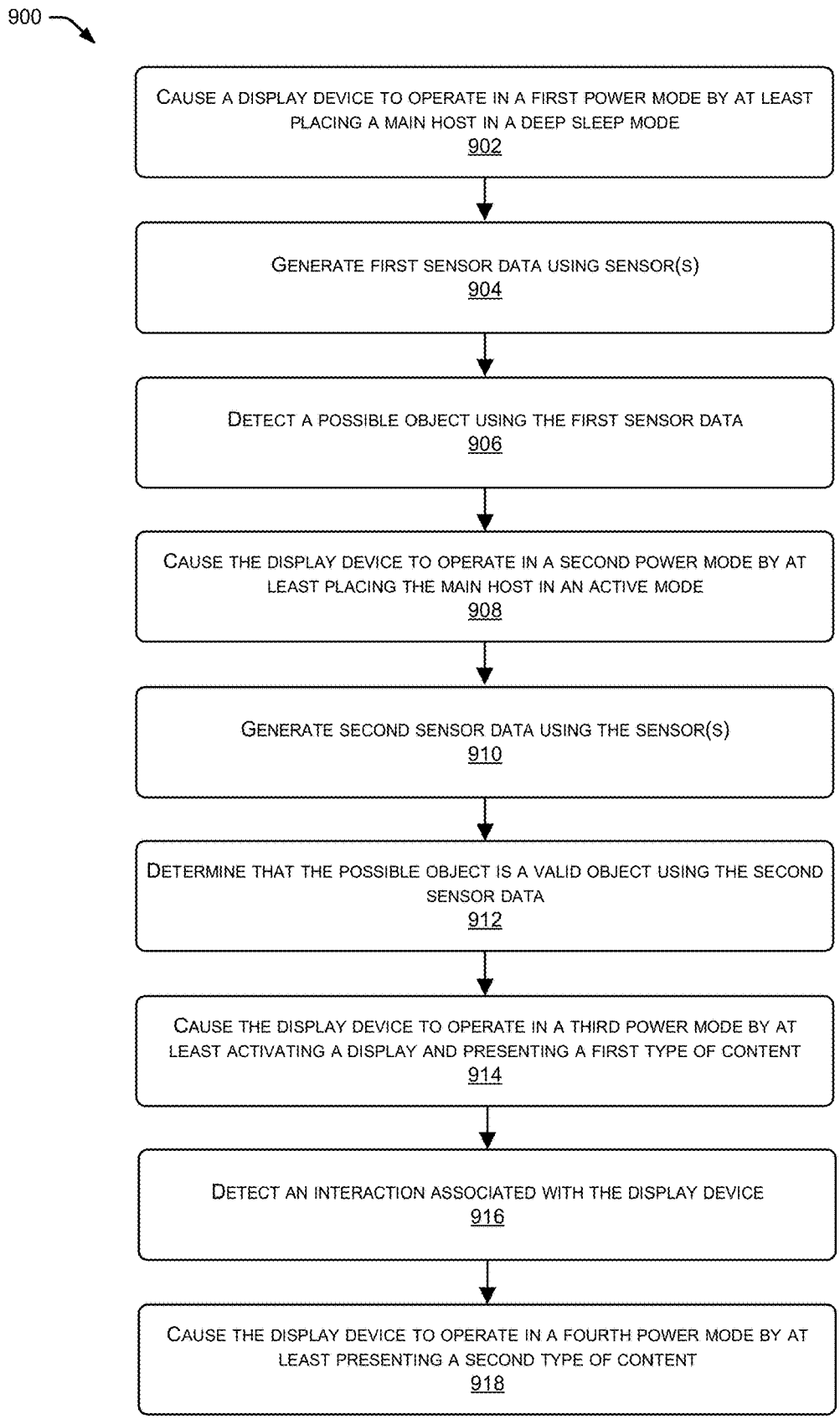
FIG. 9 illustrates an example process for operating a display device in various power modes based on presence detection, in accordance with examples of the present disclosure.
Figure 10:
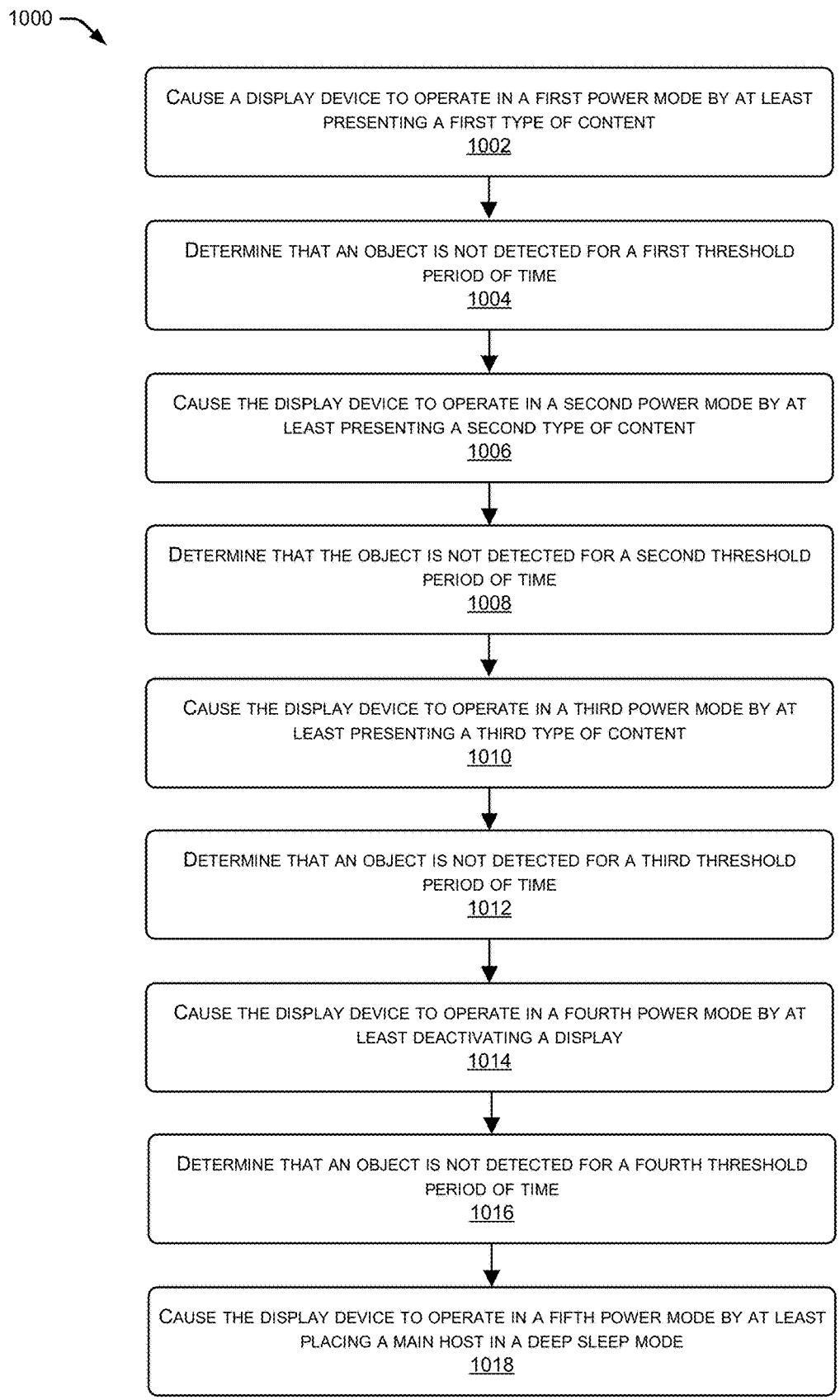
FIG. 10 illustrates an example process for operating a display device in various power modes based on no longer detecting a presence of an object, in accordance with examples of the present disclosure.
Figure 11:
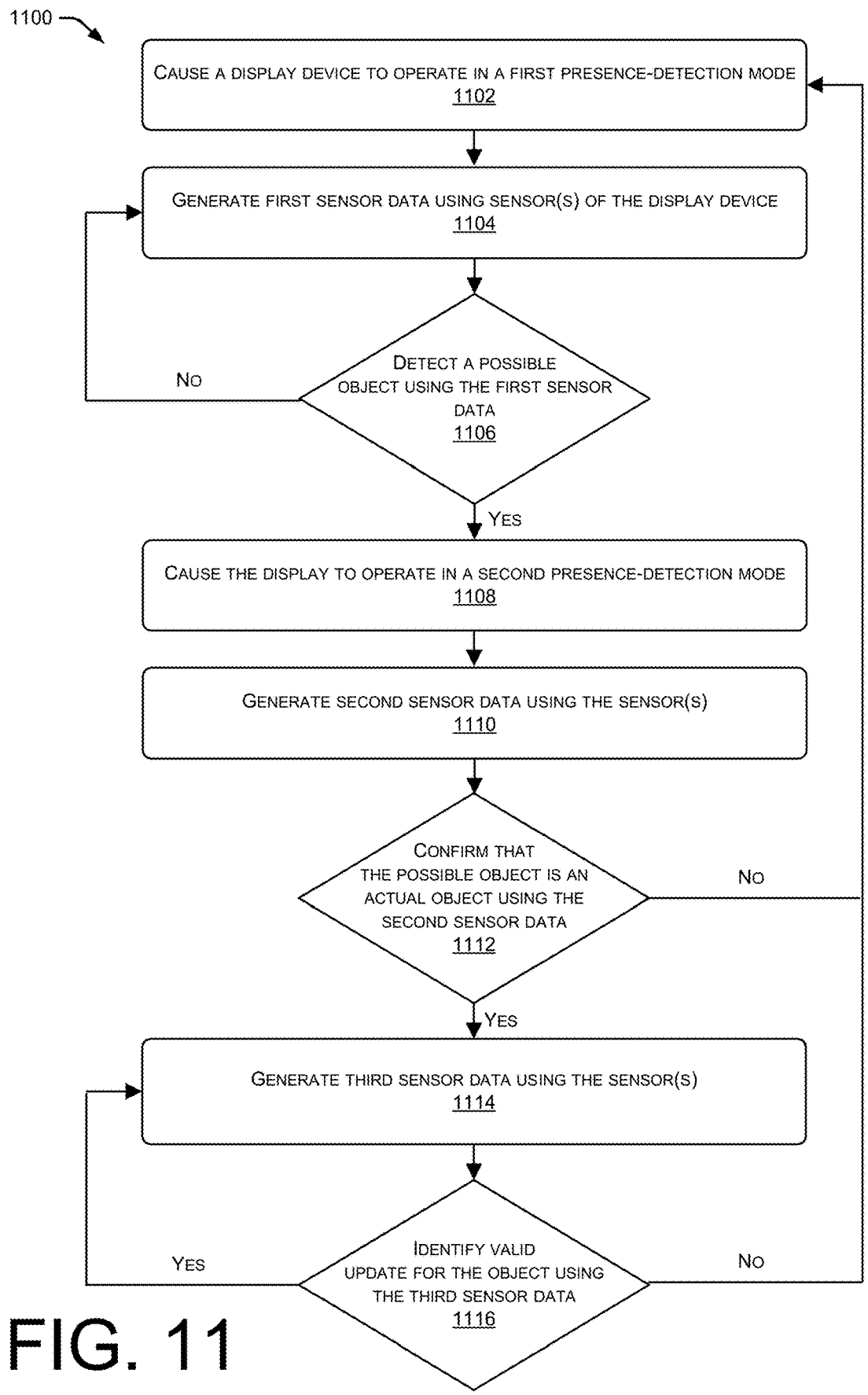
FIG. 11 illustrates an example process for operating a display device in various presence-detection modes, in accordance with examples of the present disclosure.

FIGS. 9-11 illustrate various processes for performing presence-detection modes for display devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 9 illustrates an example process for operating a display device is various power modes based on presence detection, in accordance with examples of the present disclosure. At 902, the process 900 may include causing a display device to operate in a first power mode by at least placing a main host in a deep sleep mode. For instance, the display device 802 may operate in the first power mode, which may include the standby-passive mode. While operating in the first power mode, the display device 802 may cause the main host to operate in the deep sleep mode. Additionally, the display device 802 may cause one or more other components to deactivate, such as the speaker(s), the microphone(s), the display, and/or the like. However, the display device 802 may still activate the sensor(s) that the display device 802 uses to detect the presence of objects. Additionally, the display device 802 may operate in a first presence-detection mode, such as a motion-detection mode.

At 904, the process 900 may include generating first sensor data using the sensor(s) and at 906, the process 900 may include detecting a possible object using the first sensor data. For instance, the sensor(s) of the display device 802 may generate the first sensor data. Since the display device 802 is operating in the first power mode (e.g., the main host is in the deep sleep mode) and the display device 802 is operating in the first presence-detection mode, the sensor(s) may then analyze the sensor data in order to detect the presence of the possible object. For example, such as when the sensor(s) include radar sensor(s), the radar sensor(s) may identify a peak magnitude that satisfies a threshold.

At 908, the process 900 may include causing the display device to operate in a second power mode by at least placing the main host in an active mode. For instance, based on detecting the presence of the possible object, the display device 802 may begin to operate in the second power mode, which may include a standby-active mode, by activating the main host. In some examples, the main host activates based on receiving output data from the sensor(s), where the output data indicates the presence of the possible object. The display device 802 may also activate one or more other components, such as the microphone(s). Additionally, the display device 802 may switch from operating in the first presence-detection mode to operating in a second presence-detection mode, such as a 2D-detection mode.

At 910, the process 900 may include generating second sensor data using the sensor(s) and at 912, the process 900 may include determining that the possible object is a valid object using the second sensor data. For instance, the display device 802 may generate the second sensor data using the sensor(s). Since the display device 802 is operating in the second power mode in which the main host is activate, the display device 802 may then use the main host to analyze the sensor data in order to determine that the possible object is an action object (e.g., determine that the object is valid). In some examples, the display device 802 may determine that the possible object is the actual object based on detecting the possible object for a first threshold period of time. For instance, the display device 802 may determine that there are valid updates for a target associated with the possible object, using output data received from the sensor(s), for the first threshold period of time.

At 914, the process 900 may include causing the display device to operate in a third power mode by at least activating a display device and presenting a first type of content. For instance, based on determining that the possible object is the actual object, the display device 802 may operate in the third power mode, which may include an ambient mode. As such, the display device 802 may activate at least the display so that the display device 802 may present the first type of content using the display. In some examples, the first type of content includes a user interface with one or more icons. This way, a user (e.g., the actual object) is able to interact with the display device 802.

At 916, the process 900 may include detecting an interaction associated with the display device and at 918, the process 900 may include causing the display device to operate in a fourth power mode by at least presenting a second type of content. For instance, while operating in the third power mode, the display device 802 may receive the interaction from the user. As described herein, the interaction may include, but is not limited to, a voice interaction, a touch interaction, a signal from a control device, and/or the like. Based on detecting the interaction, the display device 802 may switch to operating in the fourth power mode, which may include a content mode, by at least presenting the second type of content. In some examples, such as when the display device is a television, the second type of content may include a show.

FIG. 10 illustrates an example process 1000 for operating a display device in various power modes based on no longer detecting a presence of an object, in accordance with examples of the present disclosure. At 1002, the process 1000 may include causing a display device to operate in a first power mode by at least presenting a first type of content. For instance, the display device 802 may operate in the first power mode, which may correspond to the fourth power mode described in the examples above, such as the content mode. To operate in the first power mode, the display device 802 may activate all of its components including the display. The display device 802 may then present the second type of content. In some examples, such as when the display device is a television, the second type of content may include a show.

At 1004, the process 1000 may include determining that an object is not detected for a first threshold period of time and at 1006, the process 1000 may include causing the display device to operate in a second power mode be at least presenting a second type of content. For instance, the display device 802 may determine that the object is not detected for the first threshold period of time, which may correspond to the second threshold period of time described in the examples above. In some examples, the display device 802 may determine that the presence is not detected within a threshold distance for the first threshold period of time. In some examples, the display device may further determine that an interaction is not received for the first threshold period of time. Based on one or more of those determination, the display device 802 may then switch to operating in the second power mode, which may correspond to the fifth power mode in the examples above, such as the screensaver mode. The display device may switch to operating in the second power mode by at least presenting the second type of content, such as a screensaver.

At 1008, the process 1000 may include determining that the object is not detected for a second threshold period of time and at 1010, the process 1000 may include causing the display device to operate in a third power mode be at least presenting a third type of content. For instance, the display device 802 may determine that the object is not detected for the second threshold period of time, which may correspond to the third threshold period of time described in the examples above. In some examples, the display device 802 may determine that the presence is not detected within the threshold distance for the second threshold period of time. In some examples, the display device may further determine that an interaction is not received for the second threshold period of time. Based on one or more of those determination, the display device 802 may then switch to operating in the third power mode, which may correspond to the third power mode in the examples above, such as the ambient mode. The display device may switch to operating in the third power mode by at least presenting the third type of content, such as a user interface.

At 1012, the process 1000 may include determining that the object is not detected for a third threshold period of time and at 1014, the process 1000 may include causing the display device to operate in a fourth power mode be at least deactivating a display. For instance, the display device 802 may determine that the object is not detected for the third threshold period of time, which may correspond to the fourth threshold period of time described in the examples above. In some examples, the display device 802 may determine that the presence is not detected within the threshold distance for the third threshold period of time. In some examples, the display device may further determine that an interaction is not received for the third threshold period of time. Based on one or more of those determination, the display device 802 may then switch to operating in the fourth power mode, which may correspond to the second power mode in the examples above, such as the standby-active mode. The display device may switch to operating in the fourth power mode by at least deactivating the display.

At 1016, the process 1000 may include determining that the object is not detected for a fourth threshold period of time and at 1018, the process 1000 may include causing the display device to operate in a fifth power mode be at least placing a main host in a deep sleep mode. For instance, the display device 802 may determine that the object is not detected for the fourth threshold period of time, which may correspond to the fifth threshold period of time described in the examples above. In some examples, the display device may further determine that an interaction is not received for the fourth threshold period of time. In some examples, the display device 802 may determine that the presence is not detected within the threshold distance for the fourth threshold period of time. Based on one or more of those determination, the display device 802 may then switch to operating in the fifth power mode, which may correspond to the first power mode in the examples above, such as the standby-passive mode. The display device may switch to operating in the fifth power mode by at least placing the main host in the deep sleep mode.

FIG. 11 illustrates an example process 1100 for operating a display device in various presence-detection modes, in accordance with examples of the present disclosure. At 1102, the process 1100 may include causing a display device to operate in a first presence-detection mode. For instance, the display device 802 may operate in the first presence-detection mode. In some examples, the first presence-detection mode includes a motion-detection mode in which the sensor(s) of the display device 802 analyze sensor data in order to detect a possible object located within a threshold distance to the display device.

For instance, at 1104, the process 1100 may include generating first sensor data using sensor(s) of the display device and at 1106, the process 1100 may include determining whether a possible object is detected using the first sensor data. For instance, the sensor(s) of the display device 802 may generate the first sensor data. Since the display device is operating in the first presence-detection mode, the sensor(s) may then analyze the sensor data to determine whether the possible object is detected, using the processes described herein. If, at 1106, it is determined that the possible object is not detected, then the process 1100 may repeat starting back at 1104. For instance, if the sensor(s) do not detect the possible object using the first sensor data, then the sensor(s) may again generate and analyze additional sensor data.

However, if, at 1106, it is determined that the possible object is detected, then at 1108, the process 1100 may include causing the display device to operate in a second presence-detection mode. For instance, if the sensor(s) do detect the possible object using the first sensor data, then the display device 802 may operate in the second presence-detection mode. In some examples, the second presence-detection mode includes a 2D-detection mode where the display device 802 determines whether the possible object if valid and/or determines updated locations for the possible object.

For instance, at 1110, the process 1100 may include generating second sensor data using the sensor(s) and at 1112, the process 1100 may include determining whether the possible object is confirmed as an actual object using the second sensor data. For instance, the sensor(s) of the display device 802 may generate the second sensor data. Since the display device 802 is operating in the second presence-detection mode, the display device 802 may receive output data from the sensor(s) and analyze the output data to determine whether the possible object is the actual object, using the processes described herein. If, at 1112, it is determined that the possible object is not the actual object, then the process 1100 may repeat starting back at 1102. For instance, if the display device 802 determines that the possible object is not the actual object using the second sensor data, then the display device 802 may switch back to operating in the first presence-detection mode.

However, if, at 1112, it is determined that the possible object is the actual object, then at 1114, the process 1100 may include generating third sensor data using the sensor(s) and at 1116, the process 1100 may include determining whether a valid update for the object is identified using the third sensor data. For instance, if the display device 802 determines that the possible object is the actual object using the second sensor data, then the display device 802 may generate the third sensor data using the sensor(s). Since the display device 802 is operating in the second presence-detection mode, the display device 802 may receive output data from the sensor(s) and analyze the output data to determine whether a valid location update for the object is identified, using the processes described herein. If, at 1116, it is determined that the valid location update is not identified, then the process 1100 may repeat starting back at 1102. For instance, if the display device 802 determines that the valid location update is not identified (e.g., for a threshold period of time), then the display device 802 may switch back to operating in the first presence-detection mode.

However, if, at 1116, it is determined that the valid location update is identified, then the process 1100 may repeat starting back at 1114. For instance, if the display device 802 determines that the valid location update is identified, then the display device 802 may generate and analyze new sensor data in order to continue identifying valid location updates for the object.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer system(s). Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A television comprising:
   a radar sensor configured to:
      while the television is operating in a standby-passive mode, generate sensor data;
      analyze the sensor data to detect a possible object; and
      determine that the possible object is located within a threshold distance to the television;
   a display;
   one or more processors; and
   one or more computer-readable media storing instructions that, when executed by the one or more processors, cause the one or more processors to perform operations comprising:
      causing the television to operate in the standby-passive mode by at least deactivating the display;
      causing the radar sensor to operate in a first presence-detection mode, wherein the radar sensor is configured to detect the possible object while operating in the first presence-detection mode by:
         analyzing the first sensor data using a first presence-detection technique to determine a magnitude of a frequency associated with a signal;
         determining, based on the first sensor data, a peak magnitude associated with the magnitude;
         determining, based on the first sensor data, that the peak magnitude satisfies a threshold magnitude; and
         detecting a possible object based at least in part on the peak magnitude satisfying the threshold magnitude;
      receiving, from the radar sensor, first output data indicating that the radar sensor detected the possible object;
      based at least in part on receiving the first output data, causing the television to operate in a standby-active mode by at least activating a processing component;
      while the television is operating in the standby-active mode:
         receiving second output data from the radar sensor, the second output data indicating at least a distance to the possible object; and
         analyzing, using the processing component, the second output data to verify that the possible object is an actual object;
      based at least in part on verifying that the possible object is the actual object, causing the television to operate in an ambient mode by at least:
         activating the display; and
         causing the display to present a user interface;
      while the television is operating in the ambient mode, detecting an interaction associated with the actual object; and
      based at least in part on detecting the interaction, causing the television to operate in an active mode by at least:
         receiving video data from one or more sources; and
         causing the display to present content represented by the video data.

2. The television of claim 1, the operations further comprising:
   receiving third output data from the radar sensor;
   analyzing, using the processing component, the third output data to determine that the actual object is outside of the threshold distance for a first threshold period of time;
   based at least in part on the actual object being outside of the threshold distance for the first threshold period of time, causing the television to again operate in the ambient mode by at least causing the display to present the user interface;
   receiving fourth output data from the radar sensor;
   analyzing, using the processing component, the fourth output data to determine that the actual object is outside of the threshold distance for a second threshold period of time;
   based at least in part on the actual object being outside of the threshold distance for the second threshold period of time, causing the television to again operate in the standby-active mode by at least causing the display to turn off;
   receiving fifth output data from the radar sensor;
   analyzing, using the processing component, the fifth output data to determine that the actual object is outside of the threshold distance for a third threshold period of time; and
   based at least in part on the actual object being outside of the threshold distance for the third threshold period of time, causing the television to again operate in the standby-passive mode by at least deactivating the processing component.

3. The television of claim 1, the operations further comprising while operating in the standby-active mode, causing the display to operate in a second presence-detection mode by at least analyzing the second output data using the processing component in order to verify that the possible object is the actual object.

4. A method comprising:
   causing a display device to operate in a first mode by at least deactivating a display of the display device;
   while the display device is operating in the first mode, generating first sensor data using a sensor of the display device;
   analyzing the first sensor data using a first presence-detection technique to determine a magnitude of a frequency associated with a signal;
   determining, based on the first sensor data, a peak magnitude associated with the magnitude;
   determining, based on the first sensor data, that the peak magnitude satisfies a threshold magnitude;
   detecting a possible object based at least in part on the peak magnitude satisfying the threshold magnitude;
   outputting, by the sensor, output data indicating that the possible object was detected;

based at least in part on the output data, causing the display device to operate in a second mode by at least activating a processing component of the display device;
while the display device is operating in the second mode, generating second sensor data using the sensor;
determining, using the processing component, that the possible object is an actual object based at least in part on the second sensor data; and
based at least in part on the possible object being the actual object, causing the display device to operate in a third mode by at least activating the display.

5. The method of claim 4, further comprising:
while the display device is operating in the third mode, causing the display to present a user interface that includes one or more icons;
while the display device is operating in the third mode, receiving an interaction associated with the actual object; and
based at least in part on receiving the interaction, causing the display device to operate in a fourth mode by at least:
receiving media data from one or more sources; and
causing the display to present content represented by the media data.

6. The method of claim 5, further comprising:
while the display device is operating in the fourth mode, generating third sensor data using the sensor;
determining, using the processing component and based at least in part on the third sensor data, that the actual object is no longer located proximate to the display device; and
based at least in part on the actual object no longer being located proximate to the display device, causing the display device to again operate in the third mode by at least causing the display to present the user interface.

7. The method of claim 5, wherein receiving the interaction associated with the actual object comprises at least one of:
receiving a touch input from the actual object;
receiving a voice input from the actual user;
receiving a command from a controller associated with the display device; or
a gesture detected by the display device.

8. The method of claim 4, further comprising:
while the display device is operating in the third mode, generating third sensor data using the sensor;
determining, using the processing component and based at least in part on the third sensor data, that the actual object is no longer located proximate to the display device for a first threshold period of time; and
based at least in part on the actual object no longer being located proximate to the display device for the first threshold period of time, causing the display device to again operate in the second mode by deactivating the display.

9. The method of claim 8, further comprising:
while the display device is again operating in the second mode, generating fourth sensor data using the sensor;
determining, using the processing component and based at least in part on the fourth sensor data, that the actual object is still no longer located proximate to the display device for a second threshold period of time; and
based at least in part on the actual object still no longer being located proximate to the display device for the second threshold period of time, causing the display device to again operate in the first mode by deactivating the processing component.

10. The method of claim 8, further comprising:
while the display device is again operating in the second mode, generating fourth sensor data using the sensor;
determining, using the processing component and based at least in part on the fourth sensor data, that the actual object is again located proximate to the display device; and
based at least in part on the actual object again being located proximate to the display device, causing the display device to again operate in the third mode by activating the display.

11. The method of claim 4, further comprising:
determining, by the sensor and based at least in part on the first sensor data, that the possible object is located within a threshold distance to the display device,
wherein the causing of the display device to operate in the second mode is further based at least in part on the possible object being located within the threshold distance to the display device.

12. The method of claim 4, further comprising:
determining, by the processing component and based at least in part on the second sensor data, that the actual object is located within a threshold distance to the display device,
wherein the causing of the display device to operate in the third mode is further based at least in part on the actual object being located within the threshold distance to the display device.

13. The method of claim 4, further comprising while the display device is operating in the second mode, analyzing the second sensor data using a second presence-detection technique.

14. The method of claim 13, wherein:
analyzing the second sensor data using the second presence-detection technique comprises:
receiving, by the processing component, the output data from the sensor, the output data further indicating at least a first distance to the possible object;
receiving, by the processing component, second output data from the sensor, the second output data being generated using the second sensor data and indicating at least a second distance to the possible object; and
identifying, by the processing component, a valid update associated with the possible object based at least in part on the first distance and the second distance; and
determining that the possible object is the actual object is based at least in part on identifying the valid update.

15. The method of claim 14, wherein identifying the valid update associated with the possible object comprises:
determining, by the processing component, a difference between the first distance and the second distance;
determining, by the processing component, that the difference satisfies a threshold distance; and
identifying, by the processing component, the valid update for the possible object based at least in part on the difference satisfying the threshold distance.

16. The method of claim 13, wherein:
analyzing the second sensor data using the second presence-detection technique comprises:
receiving, by the processing component, second output data from the sensor, the second output data indicating a peak associated with a signal and determining, by the processing component, that the peak magnitude satisfies a threshold magnitude; and determining that the possible object is the actual object is based at least in part on the peak magnitude satisfying the threshold magnitude.

17. A display device comprising:

a sensor configured to:
  while the display device is operating in a first mode, generate sensor data;
  analyzing the sensor data using a first presence-detection technique to determine a magnitude of a frequency associated with a signal;
  determining, by the sensor, a peak magnitude associated with the magnitude;
  determining, by the sensor, that the peak magnitude satisfies a threshold magnitude;
  analyze the sensor data to detect a possible object based at least in part on the peak magnitude satisfying the threshold magnitude
  output, by the sensor, first output data indicating that the sensor detected the possible object;

a display;

one or more processors; and one or more computer-readable media storing instructions that, when executed by the one or more processors, cause the one or more processors to perform operations comprising:
  causing the display device to operate in the first mode by at least deactivating the display;
  while the display device is operating in the first mode, receiving the first output data from the sensor;
  based at least in part on receiving the first output data, causing the display device to operate in a second mode by at least activating a processing component of the display device;
  while the display device is operating in the second mode, receiving second output data from the sensor;
  determining, using the processing component, that the possible object is an actual object based at least in part on the second output data; and
  based at least in part on the possible object being the actual object, causing the display device to operate in a third mode by at least activating the display.

18. The display device of claim 17, wherein:

the first output data indicates a first distance to the possible object;

the second output data indicates a second distance to the possible object; and determining that the possible object is the actual object comprises determining, by the processing component, that the first distance is within a threshold distance to the second distance.

19. The display device of claim 17, wherein:

the second output data indicates a peak magnitude associated with a signal; and determining that the possible object is the actual object comprises determining, by the processing component, that the peak magnitude satisfies a threshold magnitude.

* * * * *